US012668504B2

(12) United States Patent
Yin et al.

(10) Patent No.: US 12,668,504 B2
(45) Date of Patent: Jun. 30, 2026

(54) POSITIVE ELECTRODE ACTIVE MATERIAL AND PREPARATION METHOD THEREFOR, POSITIVE ELECTRODE SHEET, SECONDARY BATTERY, AND ELECTRICAL DEVICE

(71) Applicant: CONTEMPORARY AMPEREX TECHNOLOGY CO., LIMITED, Ningde (CN)

(72) Inventors: Xiang Yin, Ningde (CN); Shuangfu Li, Ningde (CN); Haitao Chen, Ningde (CN); Huan Ni, Ningde (CN); Hongyu Liu, Ningde (CN); Changfeng Bie, Ningde (CN); Na Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/307,065

(22) Filed: Aug. 22, 2025

(65) Prior Publication Data

US 2025/0368534 A1     Dec. 4, 2025

Related U.S. Application Data

(63) Continuation of application No. PCT/CN2023/139148, filed on Dec. 15, 2023.

(30) Foreign Application Priority Data

Apr. 21, 2023     (CN) .......................... 202310436352.0

(51) Int. Cl.
H01M 10/0525     (2010.01)
C01G 53/504     (2025.01)

(52) U.S. Cl.
CPC ...... C01G 53/504 (2025.01); H01M 10/0525 (2013.01); C01P 2004/34 (2013.01);
(Continued)

(58) Field of Classification Search
None
See application file for complete search history.

(56) References Cited

FOREIGN PATENT DOCUMENTS

| CN | 110817978 A | 2/2020 |
| CN | 111094188 A | 5/2020 |

(Continued)

OTHER PUBLICATIONS

CN 114772556 A—machine translation.*

(Continued)

*Primary Examiner* — Haixia Zhang
(74) *Attorney, Agent, or Firm* — K&L Gates LLP

(57) ABSTRACT

A positive electrode active material and a preparation method therefor, a positive electrode sheet, a secondary battery, and an electric device, wherein the positive electrode active material comprises hollow secondary particles, the hollow secondary particles comprising $Li_aNi_xCo_yMn_zA_qM_pO_b$, $0.25 \leq a \leq 1.2$, $1.8 \leq b \leq 2$, $0.3 \leq x \leq 0.6$, $0 \leq y \leq 0.4$, $0 < z \leq 0.4$, $0 \leq q \leq 0.02$, and $0 < p \leq 0.02$, the atomic percentage of element M at grain boundaries being greater than or equal to the atomic percentage of element M in bulk phase parts of primary particles, and element A being distributed in the hollow secondary particles in the form of bulk phase doping. The positive electrode active material comprises the hollow secondary particles, element M is mainly distributed at the grain boundary of the hollow secondary particles, and element A can be optionally doped, thereby keeping good cycle performance while effectively improving the power performance.

16 Claims, 5 Drawing Sheets

(52) U.S. Cl.
 CPC ...... *C01P 2004/61* (2013.01); *C01P 2006/10*
  (2013.01); *C01P 2006/40* (2013.01)

(56) References Cited

FOREIGN PATENT DOCUMENTS

| | | | |
|---|---|---|---|
| CN | 112054184 A | 12/2020 |
| CN | 112909260 A | 6/2021 |
| CN | 113258061 A | 8/2021 |
| CN | 114744188 A | 7/2022 |
| CN | 114772556 A | 7/2022 |
| CN | 114937769 A | 8/2022 |
| CN | 115385394 A | 11/2022 |
| KR | 20190068294 A | 6/2019 |

OTHER PUBLICATIONS

CN 115385394 A—machine translation.*
International Search Report in the international application No. PCT/CN2023/139148, mailed on Mar. 20, 2024, 6 pages with English translation.
ISA Written Opinion in the international application No. PCT/CN2023/139148, mailed on Mar. 20, 2024, 7 pages with English translation.
Office Action (with English Machine Translation), mailed Aug. 25, 2025, for corresponding Chinese Patent Application Serial No. 202310436352.0.

* cited by examiner

1000

100

221

2211

2212                    2212

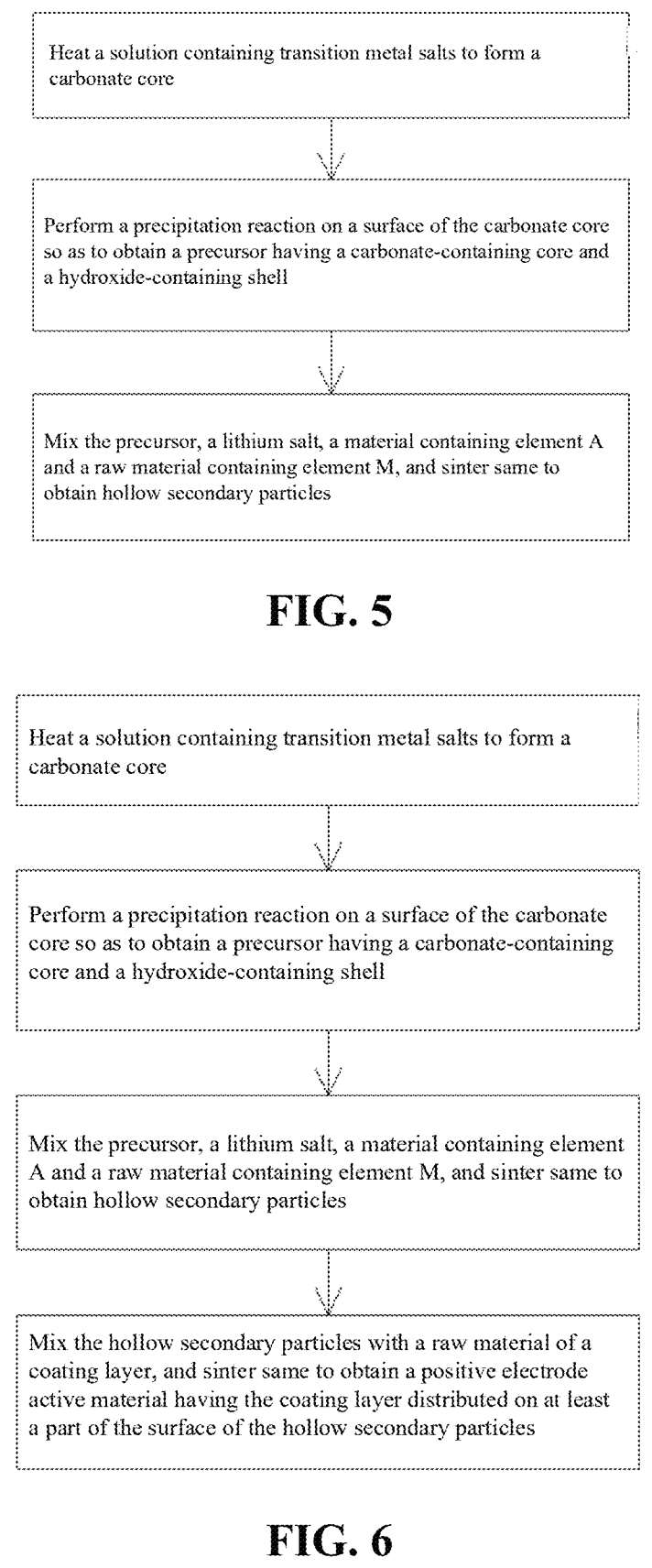

Heat a solution containing transition metal salts to form a
carbonate core

↓

Perform a precipitation reaction on a surface of the carbonate core
so as to obtain a precursor having a carbonate-containing core and
a hydroxide-containing shell

↓

Mix the precursor, a lithium salt, a material containing element A
and a raw material containing element M, and sinter same to
obtain hollow secondary particles

FIG. 5

Heat a solution containing transition metal salts to form a
carbonate core

↓

Perform a precipitation reaction on a surface of the carbonate
core so as to obtain a precursor having a carbonate-containing
core and a hydroxide-containing shell

↓

Mix the precursor, a lithium salt, a material containing element
A and a raw material containing element M, and sinter same to
obtain hollow secondary particles

↓

Mix the hollow secondary particles with a raw material of a
coating layer, and sinter same to obtain a positive electrode
active material having the coating layer distributed on at least
a part of the surface of the hollow secondary particles

FIG. 6

POSITIVE ELECTRODE ACTIVE MATERIAL AND PREPARATION METHOD THEREFOR, POSITIVE ELECTRODE SHEET, SECONDARY BATTERY, AND ELECTRICAL DEVICE

CROSS-REFERENCE TO RELATED APPLICATIONS

The present application is a continuation of International Application No. PCT/CN2023/139148, filed on Dec. 15, 2023, which claims priority to Chinese Patent Application 202310436352.0 filed on Apr. 21, 2023 and entitled "POSITIVE ELECTRODE ACTIVE MATERIAL AND PREPARATION METHOD THEREFOR, POSITIVE ELECTRODE PLATE, SECONDARY BATTERY, AND ELECTRICAL DEVICE", the content of which is incorporated herein by reference in its entirety.

TECHNICAL FIELD

The present application relates to the technical field of secondary batteries, and in particular, to a positive electrode active material and a preparation method therefor, a positive electrode plate, a secondary battery, and an electrical device.

BACKGROUND

The development of power lithium-ion batteries with high power performance and high cycling stability is an urgent need of the current market. However, in the current research on nickel-containing positive electrode active materials such as lithium nickel cobalt manganese oxide ternary positive electrode materials, the effective improvement of power performance usually results in impaired cycling performance.

SUMMARY

In view of the above problems, the present application provides a positive electrode active material and a preparation method therefor, a positive electrode plate, a secondary battery, and an electrical device, which effectively improves power performance while maintaining good cycling performance.

In a first aspect, an embodiment of the present application provides a positive electrode active material, the positive electrode active material includes hollow secondary particles; the hollow secondary particles include $Li_aNi_xCo_yMn_zA_qM_pO_b$, where $0.2 \leq a \leq 1.2$, $1.8 \leq b \leq 2$, $0.3 \leq x \leq 0.6$, $0 \leq y \leq 0.4$, $0 < z \leq 0.4$, $0 \leq q \leq 0.02$, and $0 < p \leq 0.02$, element A includes one or more of Al, Ti, Zr, Sr, B, La and Y, and element M includes one or more of W, Mo, Nb, Y, Ta, La, Zr and Co; atomic percent of the element M at grain boundaries is greater than or equal to atomic percent of the element M in the bulk-phase part of primary particles, and a distance from the bulk-phase part to the surface of the primary particles is equal to a volume average particle size Dv50 of the primary particles multiplied by 5%; and the element A is distributed in the hollow secondary particles by bulk doping.

In the technical solution of the embodiment of the present application, the hollow structure of the hollow secondary particles is conducive to reducing the internal resistance of the particles, shortening the lithium ion diffusion path, and accelerating the transmission of ions inside the particles to improve power performance. The positive electrode active material contains a certain amount of element M. On the one hand, it is beneficial to stabilize the crystal structure of the primary particles, improve the bonding strength between the primary particles and reduce the cracking and breaking of the hollow secondary particles during cycling, thereby improving cycling performance; on the other hand, it is beneficial to improve ion transport rate at the grain boundaries, thereby improving power performance. The element M is more distributed at the grain boundaries of the hollow secondary particles. Compared with the element M more distributed in the bulk-phase part of the primary particles, the element M mainly distributed at the grain boundaries can better coordinate with residual alkali of the positive electrode active material, which is conducive to strengthening the bonding strength of element M to the grain boundaries, thereby further stabilizing the structure of the hollow secondary particles and improving the cycling performance; it is also beneficial to increase the ion transport rate at the grain boundaries and improve the power performance.

Optionally, when a small amount of element A is doped into the positive electrode active material, it is also beneficial to stabilize the crystal structure, thereby improving the power performance and cycling performance.

In some embodiments, residual alkali in the positive electrode active material includes $Li_2CO_3$ and $LiOH$; in the positive electrode active material, content of $Li_2CO_3$ is s, and content of $LiOH$ is t, where $0.05$ wt $\% \leq s \leq 3$ wt %, and $0 < t \leq 0.4$ wt %; optionally, at least one of the following conditions (a1) and (a2) is satisfied: (a1) $0.0$ 5wt $\% \leq s \leq 0.4$ wt %; and (a2) $0 < t \leq 0.25$ wt %. In this embodiment, the positive electrode active material has a certain content of residual alkali, which, on the one hand, can better coordinate with the element M mainly distributed at the grain boundaries, facilitating the improvement of the cycling performance; on the other hand, can provide some lithium ion transmission sites, facilitating the improvement of the power performance; and furthermore, can attract acidic substances in an electrolyte and reduce side reactions between the hollow secondary particles and the electrolyte, facilitating the improvement of the cycling performance. A certain amount of residual alkali in the positive electrode active material can provide some lithium ion transmission sites, reduce the side reactions between the hollow secondary particles and the electrolyte, and coordinate with the element M to strengthen the bonding strength to the grain boundaries and stabilize the structure of the hollow secondary particles; moreover, an appropriate amount of residual alkali content can control the gas production, thereby further improving the cycling performance.

In some embodiments, $0 < q \leq 0.005$. In this embodiment, doping the positive electrode active material with an appropriate amount of element A is conducive to stabilizing the crystal structure, thereby improving the power performance and cycling performance; moreover, the appropriate amount of element A further improves gram capacity of the positive electrode active material.

In some embodiments, $0 < p \leq 0.01$. In this embodiment, doping the positive electrode active material with a appropriate amount of element M is conducive to stabilizing the crystal structure of the primary particles, improving the bonding strength between the primary particles and reducing the cracking and breaking of the hollow secondary particles during the cycling, improving the ion transport rate at the grain boundaries, and realizing better coordination with the residual alkali; moreover, the appropriate amount of element M further improves gram capacity of the positive electrode active material.

In some embodiments, at least one of the following conditions (b1) to (b5) is satisfied: (b1) the volume average particle size Dv50 of the hollow secondary particles is 2-5 μm; (b2) the volume average particle size Dv50 of the hollow secondary particles is 2.5-3.5 μm; (b3) the hollow secondary particles have a wall thickness of 0.2-1.6 μm; (b4) a ratio of cavity diameter of the hollow secondary particles to the volume average particle size Dv50 of the hollow secondary particles is k, where 0.1≤k≤0.8; and (b5) the ratio of the cavity diameter of the hollow secondary particles to the volume average particle size Dv50 of the hollow secondary particles is k, where 0.5≤k≤0.8. In this embodiment, when the hollow secondary particles satisfy the requirement for a specific volume average particle size, the hollow secondary particles have the appropriate particle size and specific surface area, which can maintain the appropriate electrochemical activity, thus enabling good power performance while controlling side reactions effectively. When the hollow secondary particles satisfy the specific wall thickness requirements, the hollow secondary particles have a small wall thickness, so that the hollow secondary particles have lower internal resistance and shorter lithium ion diffusion path, and lithium ions can be transmitted faster inside the hollow secondary particles, thereby achieving good power performance; when the ratio k of the cavity diameter of the hollow secondary particles to the volume average particle size meets a specific range, the hollow secondary particles have an appropriate relative wall thickness, which can reduce internal stress of the material and is conducive to maintaining the structural stability and power performance of the material; moreover, it can maintain good power performance.

In some embodiments, the positive electrode active material further includes a coating layer distributed on at least a part of the surface of the hollow secondary particles; and the coating layer comprises element Al and/or element B. In this embodiment, the coating layer can reduce the contact area between the hollow secondary particles and the electrolyte, and can reduce the side reactions between the hollow secondary particles and the electrolyte, thereby facilitating the improvement of the cycling performance.

In some embodiments, in the positive electrode active material, a ratio of total content of the element Al and/or element B in the coating layer to mass of the positive electrode active material is b, satisfying at least one of the following conditions (c1) and (c2): (c1) 0<b≤5 wt %; and (c2) 0.1 wt %≤b≤2 wt %. In this embodiment, the specified elements in the coating layer satisfy an appropriate mass ratio in the positive electrode active material, which can maintain the gram capacity of the positive electrode active material well while effectively reducing the side reactions between the hollow secondary particles and the electrolyte.

In some embodiments, in the coating layer, at least one of the following conditions (d1) and (d2) is satisfied: (d1) a mass ratio of Al to B is 1-5; and (d2) the mass ratio of Al to B is 2-2.5. In this embodiment, the coating layer includes both Al and B. A compound containing Al can effectively reduce side reactions, and a compound containing B can effectively enhance conductivity of the material. Al and B are combined at an appropriate mass ratio, which can effectively improve cycling performance while facilitating the improvement of power performance.

In some embodiments, the positive electrode active material has a true density of ≥4.6 g/cm³. In this embodiment, the true density of the positive electrode active material is higher than a specific standard, so that the positive electrode active material has a high energy density.

In a second aspect, an embodiment of the present application provides a positive electrode plate, including the positive electrode plate according to the above embodiments.

In a third aspect, an embodiment of the present application provides a secondary battery, including the positive electrode plate according to the above embodiments.

In a fourth aspect, an embodiment of the present application further provides an electrical device, including the secondary battery according to the above embodiments.

In a fifth aspect, an embodiment of the present application provides a preparation method for the positive electrode active material as described in the above embodiments. The preparation method includes heating a solution containing transition metal salts to form a carbonate core; performing a precipitation reaction on the surface of the carbonate core so as to obtain a precursor having a carbonate-containing core and a hydroxide-containing shell; and mixing the precursor, a lithium salt, a material containing element A and a raw material containing element M, and sintering to obtain hollow secondary particles.

In some embodiments, at least one of the following conditions (e1) to (e3) is satisfied: (e1) the pH value of the solution containing transition metal salts is 10.5-12; (e2) time for heating the solution containing transition metal salts is 14-25 h; (e3) the time for the precipitation reaction is 20-28 h; and (e4) a molar ratio of the precursor to the lithium salt is 1:(1-1.2). In this embodiment, when at least one of the pH value of the solution containing the transition metal salts, the time for heating the solution containing the transition metal salts, and the time for the precipitation reaction to occur meets specific requirements, it is beneficial to form a positive electrode active material in which the ratio k of the cavity diameter of the hollow secondary particles to the volume average particle size meets an appropriate range; a suitable mass ratio of the precursor to the lithium salt is conducive to regulating the residual alkali content in the positive electrode active material.

In some embodiments, the preparation method for the positive electrode active material further includes mixing the hollow secondary particles with a raw material of a coating layer, and sintering to obtain a positive electrode active material having the coating layer distributed on at least a part of the surface of the hollow secondary particles; wherein the coating layer comprises element Al and/or element B. In this embodiment, the coating layer is formed on at least a part of the surface of the hollow secondary particles, the coating layer can reduce the contact area between the hollow secondary particles and an electrolyte, and can reduce side reactions between the hollow secondary particles and the electrolyte, thereby facilitating the improvement of cycling performance.

The foregoing description is merely an overview of the technical solutions of the embodiments of the present application. In order to enable a clearer understanding of the technical solutions of the present application so that the present application can be implemented according to the content of the specification and to make the foregoing and other objectives, features, and advantages of the present application more evident and comprehensible, specific embodiments of the present application are provided hereby below.

DESCRIPTION OF THE DRAWINGS

To more clearly describe the technical solutions of the embodiments of the present application, the drawings to be used in the embodiments will be briefly introduced below, and it should be understood that the following drawings only show some embodiments of the present application, and therefore should not be considered as limiting the scope of the present application. For those of ordinary skills in the art, other relevant drawings may also be obtained based on these drawings without creative efforts.

FIG. 5 is a process flow chart of a preparation method for a positive electrode active material, according to some embodiments of the present application;

FIG. 6 is a process flow chart of a preparation method for a positive electrode active material, according to some embodiments of the present application;

REFERENCE NUMERALS

Figure 1:
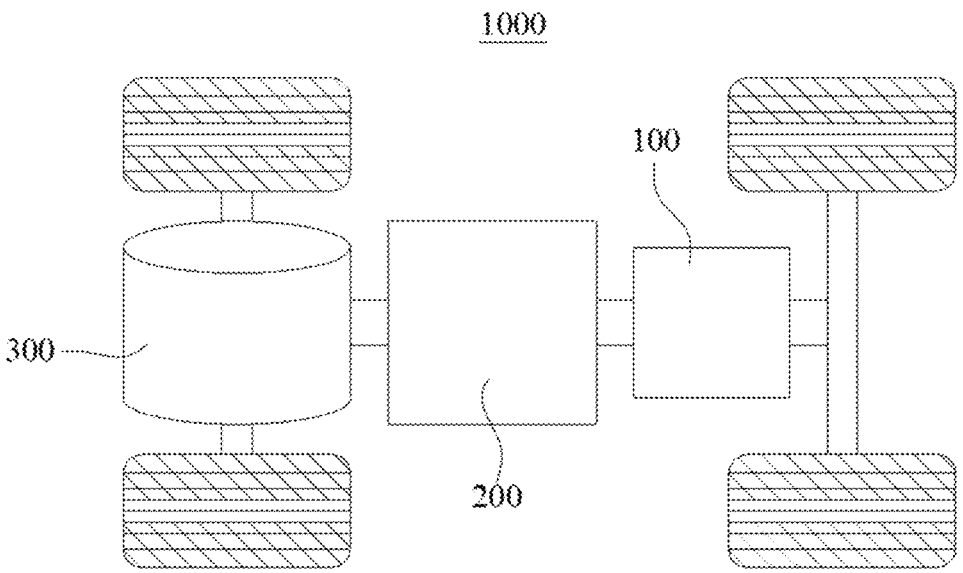
FIG. 1 is a schematic structural diagram of a vehicle according to some embodiments of the present application.

1000—vehicle;
100—battery; 200—controller; 300—motor;
10—box body; 11—first part; 12—second part; 13—accommodating space;
20—secondary battery; 21—housing; 22—electrode assembly; 23—electrode terminal; 24—pressure relief structure;
211—case; 212—cover;
221—positive electrode plate; 2211—positive electrode current collector; 2212—positive electrode active material layer.

DETAILED DESCRIPTION

In order to make the objects, technical solutions, and advantages of the embodiments of the present application more clear, the technical solutions of the embodiments of the present application will be described clearly and completely below. In embodiments in which no specific conditions are indicated, conventional conditions or conditions recommended by manufacturers are followed. The reagents or instruments used in which no manufacturers are indicated are all commercially available conventional products.

The embodiments of the technical solutions of the present application will be described in detail below with reference to the accompanying drawings. The following embodiments are only used to more clearly illustrate the technical solutions of the present application, therefore only as examples, and cannot be used to limit the scope of protection of the present application.

Unless otherwise defined, all technical and scientific terms used herein have the same meanings as commonly understood by those skilled in the technical field to which the present application belongs. The terms used herein are intended only for the purpose of describing specific embodiments and are not intended to limit the present application. The terms "include" and "have" and any variations thereof in the specification and the claims of the present application and in the above Description of Drawings are intended to encompass non-exclusive inclusion.

In the description of the embodiments of the present application, the technical terms "first", "second", etc., are used only to distinguish between different objects and are not to be understood as indicating or implying a relative importance or implicitly specifying the number, particular order, or primary and secondary relationship of the technical features indicated.

In the description of the embodiments of the present application, the technical term "and/or", such as "Feature 1 and/or Feature 2", means "Feature 1" alone, "Feature 2" alone, or "Feature 1" plus "Feature 2".

In the description of the embodiments of the present application, the meaning of "more" in "one or more" is two or more, unless otherwise specified.

Reference to "an embodiment" herein means that a particular feature, structure, or characteristic described with reference to an embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the embodiments of the present application, like reference numerals indicate like components, and for the sake of brevity, detailed description of the same components is omitted in different embodiments. It should be understood that the thickness, length, width, and other dimensions of the various components in the embodiments of the present application as shown in the drawings, and the overall thickness, length, width, and other dimensions of an integrated apparatus, are for illustrative purpose only and should not constitute any limitation to the present application.

From the perspective of the development of the market situation, power batteries are increasingly more widely used. Power batteries are not only applied in energy storage power systems such as water, fire, wind and solar power stations, but also widely applied in electric transport tools, such as electric bicycles, electric motorcycles, and electric vehicles, as well as many fields, such as military equipment and aerospace. With continuous expansion of application fields of electric vehicle batteries, market demands for electric vehicle batteries are also expanding.

Secondary batteries disclosed in embodiments of the present application may be used in, but not limited to, electrical devices, such as a vehicle, a ship, or an aircraft. Embodiments of the present application provide an electrical device that uses a battery as a power supply, and the electrical device may be, but is not limited to, a mobile phone, a tablet, a laptop, an electric toy, an electric tool, a battery vehicle, an electric vehicle, a ship, a spacecraft, etc. Electric toys may include fixed or mobile electric toys, e.g., game consoles, electric car toys, electric ship toys, and electric airplane toys, etc., and the spacecraft can include airplanes, rockets, space shuttles, and spaceships, etc.

For the convenience of explanation, the following embodiments are used for illustration where a vehicle is taken, for example, as an electrical device in an embodiment of the present application.

Referring to FIG. 1, FIG. 1 is a schematic structural diagram of a vehicle 1000 according to some embodiments of the present application. The vehicle 1000 may be a fuel vehicle, a gas vehicle, or a new energy vehicle. The new energy vehicle may be an all-electric vehicle, a hybrid vehicle, an extended-range electric vehicle, etc. A battery 100 is arranged in the vehicle 1000. The battery 100 may be arranged at the bottom, or head, or tail of the vehicle 1000. The battery 100 may be used as a power supply for the vehicle 1000, for example, the battery 100 may be used as an operating power source for the vehicle 1000. The vehicle 1000 may further comprise a controller 200 and a motor 300. The controller 200 is used to control the battery 100 to supply power to the motor 300, for example, for the operating power demand when the vehicle 1000 is starting, navigating and driving.

In some examples of the present application, the battery 100 not only can serve as an operating power source of the vehicle 1000, but also can serve as a driving power source of the vehicle 1000, to provide a driving power for the vehicle 1000 in place of or partially in place of fuel or natural gas.

In the present application, the battery 100 refers to a single physical module that includes a plurality of secondary batteries 20 to provide higher voltage and capacity, which may be in the form of a battery pack, a battery module, etc. The battery 100 may comprise a box body 10 used for encapsulating a plurality of secondary batteries 20. The box body 10 may prevent liquid or other foreign matters from affecting the charging or discharging of the secondary batteries 20.

Figure 2:
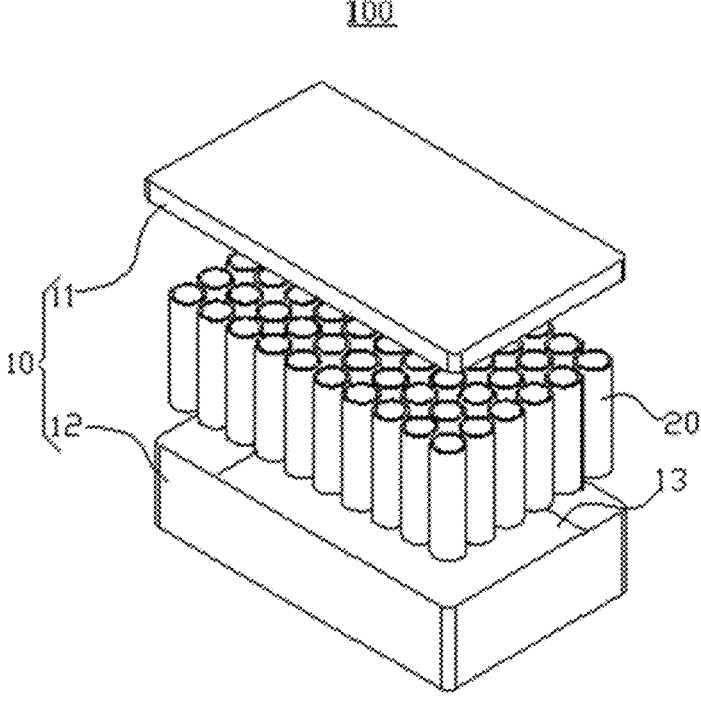
FIG. 2 is an exploded view of a battery according to some embodiments of the present application.

Referring to FIG. 2, FIG. 2 is an exploded view of the battery 100 according to some embodiments of the present application. The battery 100 comprise a box body 10 and a plurality of secondary batteries 20. The plurality of secondary batteries 20 are accommodated in the box body 10. The box body 10 is used for accommodating the secondary batteries 20 and may be in various structural forms. In some embodiments, the box body 10 may include a first part 11 and a second part 12. The first part 11 and the second part 12 cover each other, and the first part 11 and the second part 12 together define the accommodating space 13 for accommodating the secondary batteries 20. The second part 12 may have a hollow structure with one end open, and the first part 11 has a plate-like structure. The first part 11 covers the open side of the second part 12 to form the box body 10 having the accommodating space 13. The first part 11 and the second part 12 may also both have a hollow structure with one side open, and the open side of the first part 11 covers the open side of the second part 12 to form the box body 10 having the accommodating space 13. Of course, the first portion 11 and the second portion 12 may be of a variety of shapes, such as a cylinder or a cuboid.

In the battery 100, the plurality of secondary batteries 20 may be connected in series or in parallel or be in parallel-series connection. The parallel-series connection means that the plurality of secondary batteries 20 are connected in both series and parallel. The plurality of secondary batteries 20 may be directly connected in series or parallel or series-parallel connection, and then an entirety composed of the plurality of secondary batteries 20 may be accommodated in the box body 10. The case may also be that a plurality of secondary batteries 20 are connected in series, or in parallel, or in parallel-series in advance to form a battery module, and a plurality of battery modules are then connected in series, or in parallel, or in parallel-series to form an entirety, which is accommodated in the box body 10. The battery 100 may further comprise other structures. For example, a plurality of secondary batteries 20 may be electrically connected by a busbar component to realize the connection of the plurality of secondary batteries 20 in series, or in parallel, or in parallel-series.

The secondary batteries 20 are the minimal units constituting a battery pack. The secondary batteries each may be, without limitation, a lithium-sulfur battery, a sodium-ion battery, or a magnesium-ion battery.

Figure 3:
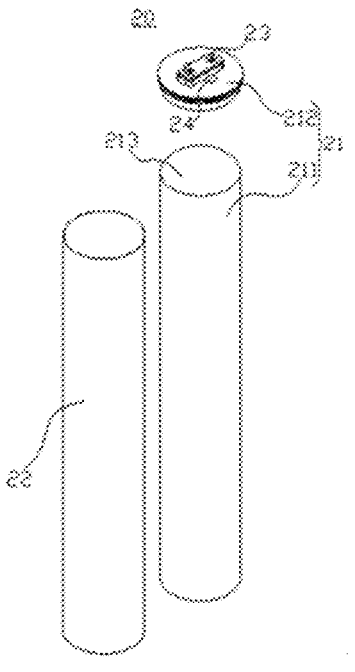
FIG. 3 is an exploded view of a secondary battery according to some embodiments of the present application.

Referring to FIG. 3, the secondary battery 20 comprises a housing 21, an electrode assembly 22, and an electrolyte, where the electrode assembly 22 and the electrolyte are both accommodated in the housing 21.

The housing 21 may include a case 211 and a cover 212. The case 211 is an assembly for matching the cover 212 to form the internal sealed space of the secondary battery 20. The formed sealed space may be used for accommodating the electrode assembly 22, the electrolyte and other components. The cover 212 refers to a component that covers the opening of the case 211 to isolate the internal environment of the secondary battery 20 from the external environment. The shape of the cover 212 may fit the shape of the case 211 to match the case 211. Functional components such as an electrode terminal 23 and a pressure relief structure 24 may also be provided on the cover 212. A sealing ring can be arranged between the opening of the case 211 and the cover 212 to achieve sealing between the case 211 and the cover 212.

The case 211 and the cover 212 may have various shapes and sizes, such as a cuboid, a cylinder, or a hexagonal prism. Specifically, the shapes of the case 211 and the cover 212 may be determined according to the specific shape and size of the electrode assembly 22. The case 211 and the cover 212 may be made of various materials, such as, but not limited to copper, iron, aluminum, stainless steel, an aluminum alloy, and other metals. The sealing ring may be made of various materials, such as, but not limited to PP (polypropylene), PC (polycarbonate), PET (polyethylene terephthalate), and other materials with electrolyte corrosion resistance, high toughness, and fatigue resistance. A plating may be formed on the outer surface of the case 211, and the plating may be made of various materials, such as, but not limited to corrosion-resistant materials including Ni, Cr, etc.

The secondary battery 20 may also be a soft pack, such as a pouch. The material of the soft pack may be a plastic, and examples of the plastic may include polypropylene, polybutylene terephthalate, polybutylene succinate, and the like.

The electrode assembly 22 may be composed of a positive electrode plate 221, a negative electrode plate and a separator. The secondary battery 20 works mainly relying on movement of metal ions between the positive electrode plate 221 and the negative electrode plate. During the charging and discharging process of the battery, active ions are intercalated and deintercalated back and forth between positive electrode plate 221 and the negative electrode plate. The separator is arranged between the positive electrode plate 221 and the negative electrode plate and mainly serves to prevent a short circuit between the positive and negative electrodes while allowing ions to pass through. The electrode assembly 22 may be of a wound structure or a stacked structure, which is not limited in the embodiments of the present application.

Figure 4:
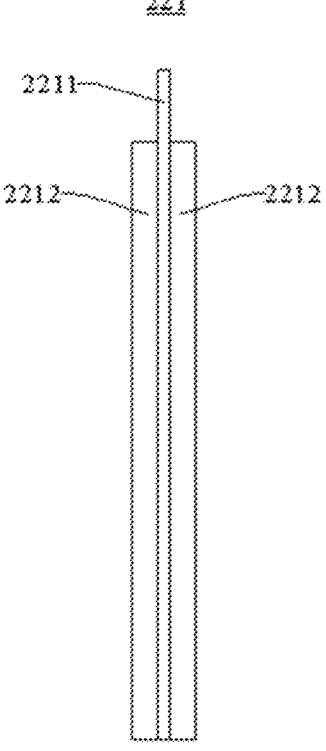
FIG. 4 is a schematic structural diagram of a positive electrode plate according to some embodiments of the present application.

Referring to FIG. 4, the positive electrode plate 221 comprises a positive electrode current collector 2211 and a positive electrode active material layer 2212 disposed on a surface of the positive electrode current collector 2211. The positive electrode current collector 2211 has two surfaces opposite to each other in its thickness direction, and the positive electrode active material layer 2212 is arranged on either or both of the two opposite surfaces of the positive electrode current collector 2211. The positive electrode current collector 2211 may be made of a metal foil or a composite current collector. The material of the positive current collector 2211 in the form of metal foil may be aluminum, and the composite current collector may comprise a high molecular material substrate layer and a metal layer formed on at least one surface of the high molecular material substrate material. The composite current collector may be formed by forming a metal material (e.g., aluminum, aluminum alloy, nickel, nickel alloy, titanium, titanium alloy, silver, or silver alloy) on the high molecular material substrate (e.g., a substrate of polypropylene (PP), polyethylene terephthalate (PET), polybutylene terephthalate (PBT), polystyrene (PS), or polyethylene (PE)). The positive electrode active material in the positive electrode active material layer 2212 may include the positive electrode active material provided in the embodiments of the present application, and may further include lithium cobalt oxide, lithium iron phosphate, lithium manganese oxide, lithium sulfur, and other positive electrode active materials. In some embodiments, the positive electrode active material layer 2212 further comprises optionally a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorinated acrylate resin. In some embodiments, the positive electrode active material layer 2212 further comprises optionally a conductive agent. As an example, the conductive agent may include at least one of superconducting carbon, acetylene black, carbon black, Ketjen black, carbon dots, carbon nanotubes, graphene, and carbon nanofibers.

The negative electrode plate comprises a negative electrode current collector and a negative electrode active material layer arranged on a surface of the negative electrode current collector. The negative-electrode current collector has two opposite surfaces in its own thickness direction, and the negative electrode active material layer is arranged on either or both of the opposite surfaces of the negative electrode current collector. The negative electrode current collector may be made of a metal foil or a composite current collector. The material of the negative current collector in the form of metal foil may be copper, and the composite current collector may comprise a high molecular material substrate layer and a metal layer formed on at least one surface of the high molecular material substrate. The composite current collector may be formed by forming a metal material (e.g., copper, copper alloy, nickel, nickel alloy, titanium, titanium alloy, silver, or silver alloy) on the high molecular material substrate (e.g., a substrate of polypropylene (PP), polyethylene terephthalate (PET), polybutylene terephthalate (PBT), polystyrene (PS), or polyethylene (PE)). The negative electrode active material in the negative electrode active material layer may be carbon, silicon, or other negative electrode active materials. As an example, the negative electrode active material may include at least one of the following materials: artificial graphite, natural graphite, soft carbon, hard carbon, a silicon-based material, a tin-based material, lithium titanate, etc. The silicon-based material may be selected from at least one of elemental silicon, a silicon-oxygen compound, a silicon-carbon composite, a silicon-nitrogen composite, and a silicon alloy. The tin-based material may be selected from at least one of elemental tin, tin-oxygen compound, or tin alloy. However, the present application is not limited to these materials. Other traditional materials that can be used as negative electrode active materials may also be used. These negative electrode active materials may be used alone or in a combination of two or more thereof. In some embodiments, the negative electrode active material layer further comprise optionally a binder. The binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS). In some embodiments, the negative electrode active material layer further comprises optionally a conductive agent. The conductive agent may be selected from at least one of superconducting carbon, acetylene black, carbon black, Ketjen black, carbon dot, carbon nanotube, graphene, and carbon nanofiber. In some embodiments, the negative electrode active material layer further comprises optionally other auxiliaries, e.g., a thickener (such as sodium carboxymethyl cellulose (CMC-Na)).

The embodiments of the present application have no particular limitation on the type of the separator, and any well-known porous structure separator with good chemical stability and mechanical stability can be used.

In some embodiments, the material of the separator may be selected from at least one of glass fiber, non-woven cloth, polyethylene, polypropylene, and polyvinylidene fluoride. The separator may be a single-layer film or a multi-layer composite film, and is not particularly limited. When the separator is a multilayer composite film, the material in each layer may be same or different, which is not particularly limited.

The electrolyte serves to conduct ions between the positive electrode plate 221 and the negative electrode plate. In some embodiments, the electrolyte contains an electrolyte salt and a solvent, where the type of the electrolyte salt and solvent is not particularly limited and may be selected according to actual needs.

In some embodiments, the electrolyte salt may be selected from at least one of lithium hexafluorophosphate, lithium tetrafluoroborate, lithium perchlorate, lithium hexafluoroarsenate, lithium bis (fluorosulfonyl) imide, lithium bis (trifluoromethanesulfonyl)imide, lithium trifluoromethanesulfonate, lithium difluorophosphate, lithium difluoro (oxalato)borate, lithium bis(oxalato)borate, lithium difluoro bis(oxalato)phosphate, and lithium tetrafluoro(oxalato) phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methylsulfonylmethane, ethyl methyl sulfone, and ethylsulfonylethane.

In some embodiments, the electrolyte further optionally comprises an additive. For example, the additive may include a negative electrode film-forming additive or a positive electrode film-forming additive, or may further include an additive that can improve some performance of the secondary battery 20, such as an additive that improves overcharge performance of the secondary battery 20 or an additive that improves high-temperature or low-temperature performance of the secondary battery 20.

As the new energy vehicle market continues to be strong, the demand for power batteries is growing, and the development of power lithium-ion batteries with high power performance and high cycling stability has become an urgent need in the current market. Nickel-containing positive electrode active materials, such as lithium nickel cobalt manganese oxide ternary positive electrode materials, have attracted much attention due to their advantages such as high specific capacity, high energy density, and high power output.

In order to improve the power performance and cycling stability of the nickel-containing positive electrode active materials such as the lithium nickel cobalt manganese oxide ternary positive electrode materials, some studies have focused on the following: adjusting the particle size to enhance electrochemical reactivity, doping to stabilize the crystalline structure, coating to inhibit side reactions, and constructing polycrystalline particles having a porous or hollow structure to increase the ion transport rate. However, the improvement of the reactivity will lead to more serious side reactions, the coating layer has a very limited inhibition effect on the side reactions, and the polycrystalline particles having a porous or hollow structure are prone to cracking or breaking during repeated charging and discharging at high voltages. Moreover, the improvement of the ion transport rate at grain boundaries of the polycrystalline particles remains a major challenge. That is, in some solutions, the power performance and cycling performance cannot be effectively improved; and in some other solutions, when the power performance is effectively improved, the cycling performance is usually damaged.

Based on this, an embodiment of the present application proposes a positive electrode active material, including hollow secondary particles, to which a certain amount of specific element M mainly distributed at grain boundaries of the hollow secondary particles is added. Optionally, a small amount of specific element A is doped, and optionally, a certain content of residual alkali in the positive electrode active material is regulated. The hollow structure of the hollow secondary particles is conducive to reducing the internal resistance of the particles, shortening the lithium ion diffusion path, and accelerating the transmission of ions inside the particles to improve the power performance. On the basis of the secondary particles having the hollow structure, the element M or M-containing compound is conducive to improving bonding strength between the primary particles and reducing the cracking and breaking of the hollow secondary particles during cycling. A certain amount of residual alkali is also able to coordinate with the element M or M-containing compound, which is conducive to strengthening the bonding strength of the element M or M-containing compound at the grain boundaries, thereby effectively improving the cycling performance. In addition, the element A is also conducive to stabilizing the crystal structure and improving the cycling performance; the element M or M-containing compound also has the effect of stabilizing the crystal structure of the primary particles, as well as the effect of improving the ion transport rate at the grain boundaries, which is conducive to improving the power performance and cycling performance; a certain amount of residual alkali can provide some lithium ion transport sites, which can attract acidic materials in the electrolyte to reduce the side reactions between hollow secondary particles and electrolyte, and is conducive to improving the power performance and cycling performance.

The positive electrode active material and the preparation method therefor as proposed in the embodiments of the present application are described below in detail.

In a first aspect, an embodiment of the present application provides a positive electrode active material, the positive electrode active material includes hollow secondary particles; the hollow secondary particles include $Li_aNi_xCo_yMn_z A_qM_pO_b$, where $0.2 \leq a \leq 1.2$, $1.8 \leq b \leq 2$, $0.3 \leq x \leq 0.6$, $0 \leq y \leq 0.4$, $0 < z \leq 0.4$, $0 \leq q \leq 0.02$, and $0 < p \leq 0.02$, element A includes one or more of Al, Ti, Zr, Sr, B, La and Y, and element M includes one or more of W, Mo, Nb, Y, Ta, La, Zr and Co; atomic percent of the element M at grain boundaries is greater than or equal to atomic percent of the element M in the bulk-phase part of primary particles, and a distance from the bulk-phase part to the surface of the primary particles is equal to a volume average particle size Dv50 of the primary particles multiplied by 5%; and the element A is distributed in the hollow secondary particles by bulk doping.

The hollow secondary particles are agglomerated secondary particles with internal cavities. The secondary particles are formed by aggregation of the primary particles; the primary particles are non-agglomerated particles, i.e., single fine grains. The hollow secondary particles each are a particle with an internal cavity formed by agglomeration of single fine grains.

In the embodiment of the present application, a method of testing components of the molecular formula of $Li_aNi_x Co_yMn_zA_qM_pO_b$ included in the hollow secondary particles may be referred to conventional ways. For example, the components may be tested using a method of ICP emission spectroscopy.

It should be noted that ratios of elements in the positive electrode active material in the present application refer to ratios of elements in the positive electrode active material before the positive electrode active material is made into the positive electrode plate 221 and then assembled into the secondary battery 20 for formation. It can be understood by those skilled in the art that in the positive electrode plate 221, the secondary battery 20, and the electrical device, some elements will be consumed due to processes such as formation and cycling, and thus even if the ratios of the corresponding elements of the positive electrode active material are measured to be out of the above mentioned ranges, they should still fall within the scope of the present application.

It should be noted that in the positive electrode plate 221, the secondary battery 20, and the electrical device, the measured lithium element content a of the positive electrode active material is less than 1 because lithium ions will be consumed in the processes such as formation and cycling. Moreover, if the positive electrode plate 221 and the negative electrode plate are supplemented with lithium, after the processes such as formation and cycling, the measured lithium content a in the positive electrode active material may be greater than 1.

In an embodiment of the present application, molar coefficient a of element Li (lithium) takes a value such as, but not limited to, a point value of any one of 0.2, 0.3, 0.4, 0.5, 0.6, 0.7, 0.8, 0.9, 0.95, 1, 1.05, 1.1, 1.15, and 1.2, or a range value between any two thereof.

It should be noted that in the positive electrode plate 221, the secondary battery 20, and the electrical device, due to the loss of element oxygen in the positive electrode active material after cycling and other processes, the measured content b of the element oxygen in the positive electrode active material may be less than 2.

In an embodiment of the present application, molar coefficient b of element O (Oxygen) takes a value such as, but not limited to, a point value of any one of 1.8, 1.85, 1.9, 1.95, and 2, or a range value between any two thereof.

Molar coefficient x of element Ni (nickel) takes a value such as, but not limited to, a point value of any one of 0.3, 0.35, 0.4, 0.45, 0.5, 0.55, and 0.6 or a range value between any two thereof.

The value of molar coefficient y of the element Co (cobalt) may be 0, meaning that the molecular formula of the hollow secondary particles may have no element Co, and the value of the coefficient y is, for example, but not limited to, a point value of any one of 0, 0.05, 0.1, 0.15, 0.2, 0.25, 0.3, 0.35, and 0.4, or a range value between any two thereof.

Molar coefficient z of element Mn (manganese) takes a values such as, but not limited to, a point value of any one of 0.05, 0.1, 0.15, 0.2, 0.25, 0.3, 0.35, and 0.4 or a range value between any two thereof.

The element A refers to a class of specified elements which are, for example, elements bulk-doped in the primary particles. The value of molar coefficient q of the element A may be 0, which means that the molecular formula of the hollow secondary particles may not contain the element A. The coefficient q takes a value such as, but not limited to, a point value of any one of 0, 0.005, 0.01, 0.015, and 0.02 or a range value between any two thereof.

The element M refers to another class of specified elements which are mainly distributed at grain boundaries of the hollow secondary particles; molar coefficient p of the element M takes a value such as, but not limited to, a point value of any one of 0.005, 0.01, 0.015, and 0.02 or a range value between any two thereof.

The element A is distributed in the hollow secondary particles by bulk doping, meaning that the content of the element A is close to the same everywhere inside the hollow secondary particles, and it is distributed uniformly throughout the hollow secondary particles.

Atomic percent of the element M at the grain boundaries is greater than or equal to atomic percent of the element M in the bulk-phase part of the primary particles, that is, the element M is more distributed at the grain boundaries of the hollow secondary particles.

A method of testing the atomic percent of the element M at different locations may be referred to conventional ways. For example, an SEM image of the cross-section of the positive electrode active material may be obtained, and the atomic percent of the element M at different locations may be obtained by analyzing the spectrum.

The volume average particle size Dv50 refers to the particle size corresponding to 50% in the volume distribution, which may be tested using conventional methods. By way of example, the test is performed by using the device Malvern 3000 with reference to GB/T 19077-2016/ISO 13320: 2009 Particle size analysis-Laser diffraction methods.

The distance from the bulk-phase part to the surface of the primary particles is equal to the volume average particle size Dv50 of the primary particles multiplied by 5%, that is, the diameter of the bulk-phase is 90% of the volume average particle size Dv50 of the primary particles.

In some embodiments of the present application, the grain boundaries of the positive electrode active material include: grain boundaries on the outside of the hollow secondary particles, grain boundaries on the inside of the hollow secondary particles and at junctions with cavities, and grain boundaries of contact between the primary particles in the hollow secondary particles.

It should be noted that in some embodiments of the present application, the element M may, for example, be in the form of an oxide $MO_{n1}$ or a lithium metal oxide $Li_{n2}MO_{n3}$ (n1, n2, and n3 are all greater than 0), and accordingly, in the process of determining the molecular formula of the hollow secondary particles by the method of ICP emission spectroscopy, there are cases in which the detection results are x+y+z+q<1 and x+y+z+q+p>1.

In the technical solution of the embodiment of the present application, the hollow structure of the hollow secondary particles is conducive to reducing the internal resistance of the particles, shortening the lithium ion diffusion path, and accelerating the transmission of ions inside the particles to improve power performance.

The positive electrode active material contains a certain amount of element M. While maintaining a high discharge capacity of the material, on the one hand, it is beneficial to stabilize the crystal structure of the primary particles, improve the bonding strength between the primary particles and reduce the cracking and breaking of the hollow secondary particles during cycling, thereby improving cycling performance; on the other hand, it is beneficial to improve the ion transport rate at the grain boundaries, thereby improving power performance.

The element M is more distributed at the grain boundaries of the hollow secondary particles. Compared with the element M more distributed in the bulk-phase part of the primary particles, the element M mainly distributed at the grain boundaries can better coordinate with residual alkali of the positive electrode active material, which is conducive to strengthening the bonding strength of element M to the grain boundaries, thereby further stabilizing the structure of the hollow secondary particles and improving the cycling performance; it is also beneficial to increase the ion transport rate at the grain boundaries and improve the power performance.

Optionally, when a small amount of element A is doped into the positive electrode active material, it is also beneficial to stabilize the crystal structure, thereby improving the power performance and cycling performance.

In some embodiments, residual alkali in the positive electrode active material includes $Li_2CO_3$ and $LiOH$; in the positive electrode active material, content of $Li_2CO_3$ is s, and content of $LiOH$ is t, where 0.05 wt %≤s≤3 wt %, and 0<t≤0.4 wt %. Optionally, at least one of the following conditions (a1) and (a2) is satisfied: (a1) 0.05 wt %≤s≤0.4 wt %; and (a2) 0<t≤0.25 wt %.

In some embodiments of the present application, the residual alkali is mainly distributed at the grain boundaries of the hollow secondary particles. The content of the residual alkali in the positive electrode active material can be measured by conventional ways. As an example, the general method for determining the acidity and alkalinity of chemical reagents (GB/T 9724-2007) can be used for determination. The content s of $Li_2CO_3$ in the positive electrode active material is, for example, but not limited to, a point value of any one of 0.05 wt %, 0.1 wt%, 0.15 wt %, 0.2 wt%, 0.25 wt %, 0.3 wt%, 0.35 wt %, 0.4 wt%, 0.45 wt %, 0.5 wt%, 1 wt %, 1.5 wt%, 2 wt %, 2.5 wt%, 3 wt %, 3.5 wt%, and 4 wt % or a range value between any two thereof.

The content t of $LiOH$ in the positive electrode active material is, for example, but not limited to, a point value of any one of 0.05 wt %, 0.1 wt%, 0.15 wt %, 0.2 wt%, 0.25 wt %, 0.3 wt%, 0.35 wt %, and 0.4 wt %, or a range value between any two thereof.

Regarding condition (a1), optionally, 0.1 wt %≤a≤0.4 wt %.

Regarding condition (a2), optionally, 0.05 wt %<t≤0.25 wt %.

In this embodiment, the positive electrode active material has a certain content of residual alkali, which, on the one hand, can better coordinate with the element M mainly distributed at the grain boundaries, facilitating the improvement of the cycling performance; on the other hand, can provide some lithium ion transmission sites, facilitating the improvement of the power performance; and furthermore, can attract acidic substances in an electrolyte and reduce side reactions between the hollow secondary particles and the electrolyte, facilitating the improvement of the cycling performance. A certain amount of residual alkali in the positive electrode active material can provide some lithium ion transmission sites, reduce the side reactions between the hollow secondary particles and the electrolyte, and coordinate with the element M to strengthen the bonding strength to the grain boundaries and stabilize the structure of the hollow secondary particles; moreover, an appropriate amount of residual alkali content can control the gas production, thereby further improving the cycling performance.

In some embodiments, $0<q\leq0.005$.

As an example, the coefficient q takes a value such as, but not limited to, a point value of any one of 0.001, 0.002, 0.003, 0.004, and 0.005 or a range value between any two thereof.

In this embodiment, doping the positive electrode active material with an appropriate amount of element A is conducive to stabilizing the crystal structure, thereby improving the power performance and cycling performance; moreover, the appropriate amount of element A further improves gram capacity of the positive electrode active material.

In some embodiments, $0<p\leq0.01$.

As an example, the value of p is, for example, but not limited to, a point value of any one of 0.001, 0.002, 0.003, 0.004, 0.005, 0.006, 0.007, 0.008, 0.009, and 0.01 or a range value between any two thereof.

In this embodiment, doping the positive electrode active material with a appropriate amount of element M is conducive to stabilizing the crystal structure of the primary particles, improving the bonding strength between the primary particles and reducing the cracking and breaking of the hollow secondary particles during the cycling, improving the ion transport rate at the grain boundaries, and realizing better coordination with the residual alkali; moreover, the appropriate amount of element M further improves gram capacity of the positive electrode active material.

In some embodiments, the element M is mainly added and distributed in the form of a compound containing the element M, and in the positive electrode active material, the content of the compound containing the element M is greater than 0 and is less than or equal to 2 wt %.

The compound containing the element M includes, for example, one or more of $MO_{n1}$ and $Li_{n2}MO_{n3}$ (n1, n2 and n3 are all greater than 0).

As an example, the content of the compound containing the element M in the positive electrode active material is, for example, but not limited to, a point value of any one of 0.5 wt %, 1 wt %, 1.5 wt %, and 2 wt %, or a range value between any two thereof.

In some embodiments, at least one of the following conditions (b1) to (b5) is satisfied: (b1) the volume average particle size Dv50 of the hollow secondary particles is 2-5 µm; (b2) the volume average particle size Dv50 of the hollow secondary particles is 2.5-3.5 µm; (b3) the hollow secondary particles have a wall thickness of 0.2-1.6 µm; (b4) a ratio of cavity diameter of the hollow secondary particles to the volume average particle size Dv50 of the hollow secondary particles is k, where 0.1≤k≤0.8; and (b5) the ratio of the cavity diameter of the hollow secondary particles to the volume average particle size Dv50 of the hollow secondary particles is k, where 0.5≤k≤0.8.

With respect to the volume average particle size Dv50 of the hollow secondary particles, it takes a value such as, but not limited to, a point value of any one of 2 µm, 2.5 µm, 3 µm, 3.5 um, 4 µm, 4.5 µm, and 5 µm, or range value between any two thereof.

The wall thickness of the hollow secondary particles is a wall thickness value from an inner interface to an outer surface of the hollow secondary particles, which can be obtained by subtracting the size of the hollow cavity of the hollow secondary particles from the volume average particle size Dv50 of the hollow secondary particles and then dividing the size by 2, and the testing results can be obtained by obtaining multiple calculation results and then averaging the results. The dimension of the cavity is the dimension corresponding to a straight line passing through the center of the cavity and extending to two ends of the cavity.

The wall thickness of the hollow secondary particles takes a value, for example, but not limited to, a point value of any one of 0.2 µm, 0.3 µm, 0.4 µm, 0.5 µm, 0.6 µm, 0.7 µm, 0.8 µm, 0.9 µm, 1 µm, 1.1 µm, 1.2 µm, 1.3 µm, 1.4 µm, 1.5 µm, and 1.6 µm, or a range value between any two thereof.

The value of k is, for example, but not limited to, a point value of any one of 0.1, 0.2, 0.3, 0.4, 0.5, 0.6, and 0.7, 0.8, or a range value between any two thereof.

As an example, the hollow secondary particles satisfy the following conditions: the volume average particle size Dv50 of the hollow secondary particles is 2.5-3.5 µm; the hollow secondary particles have a wall thickness of 0.2-1.6 µm; and a ratio of cavity diameter of the hollow secondary particles to the volume average particle size Dv50 of the hollow secondary particles is k, where 0.5≤k≤0.8.

In this embodiment, when the hollow secondary particles satisfy the requirement for a specific volume average particle size, the hollow secondary particles have the more appropriate particle size and specific surface area, which can maintain the appropriate electrochemical activity, thus enabling good power performance while alleviating the problem of side reactions. When the hollow secondary particles satisfy the specific wall thickness requirements, the hollow secondary particles have a small wall thickness, so that the hollow secondary particles have lower internal resistance and shorter lithium ion diffusion path, and lithium ions can be transmitted faster inside the hollow secondary particles, thereby achieving good power performance; when the ratio k of the cavity diameter of the hollow secondary particles to the volume average particle size meets a specific range, the hollow secondary particles have an appropriate relative wall thickness, which can reduce internal stress of the material and is conducive to maintaining the structural stability and power performance of the material; moreover, it can maintain good power performance.

In some embodiments, the positive electrode active material further includes a coating layer distributed on at least a part of the surface of the hollow secondary particles; and the coating layer comprises element Al and/or element B.

The coating layer is distributed on at least a part of the surface of a host material, that is, the coating layer can coat part of the surface of the host material, or coat the entire surface of the host material.

The coating layer may contain element Al (aluminum), may contain element B (boron), or may contain both elements Al and B.

The element Al is added to the coating layer in the form of an Al-containing compound such as $\gamma$-$Al_2O_3$, and the final coating layer contains Al in the form of $\gamma$-$Al_2O_3$ and/or $LiAlO_2$. The element B is added to the coating layer in the form of a B-containing compound such as $H_3BO_3$, and the final coating layer contains B in the form of $H_3BO_3$ and/or $Li_3BO_3$.

In some embodiments of the present application, the coating layer is a structure that coats at least a part of the surface of the hollow secondary particles. Between the coating layer and the hollow secondary particles, it can be observed that part of the coating material is distributed in the form of small particles on the surface of the hollow secondary particles. An interface between the two can be determined by conventional ways, such as directly observing the cross section of the material using a scanning electron microscope.

In this embodiment, the coating layer can reduce the contact area between the hollow secondary particles and the electrolyte, and can reduce the side reactions between hollow secondary particles and the electrolyte, thereby facilitating the improvement of the cycling performance.

In some embodiments, in the positive electrode active material, a ratio of total content of the element Al and/or element B in the coating layer to mass of the positive electrode material is b, satisfying at least one of the following conditions (c1) and (c2): (c1) $0<b\leq 5$ wt %; and (c2) 0.1 wt %$\leq b\leq 2$ wt %.

As an example, the ratio b of total content of the element Al and/or element B in the coating layer to mass of the positive electrode material takes a value, for example, but not limited to, a point value of any one of 0.1 wt %, 0.5 wt%, 1 wt %, 1.5 wt%, 2 wt %, 2.5 wt%, 3 wt %, 3.5 wt%, 4 wt %, 4.5 wt%, and 5 wt %, or a range value between any two thereof.

In this embodiment, the specified elements in the coating layer satisfy an appropriate mass ratio in the positive electrode active material, which can maintain the gram capacity of the positive electrode active material well while effectively reducing the side reactions between the hollow secondary particles and the electrolyte.

In some embodiments, in the coating layer, at least one of the following conditions (d1) and (d2) is satisfied: (d1) a mass ratio of Al to B is 1-5; and (d2) the mass ratio of Al to B is 2-2.5.

As an example, the mass ratio of Al to B is, for example, but not limited to, a point value of any one of 1, 1.5, 2, 2.5, 3, 3.5, 4, 4.5, and 5 or a range value between any two thereof.

In this embodiment, the coating layer contains both Al and B. The compound containing the element Al can effectively reduce side reactions, and the compound containing the element B can effectively enhance the conductivity of the material. Al and B are combined at an appropriate mass ratio, which can effectively improve cycling performance while facilitating the improvement of power performance.

In some embodiments, the positive electrode active material has a true density of >4.6 $g/cm^3$.

The true density of the positive electrode active material refers to the actual mass of a solid material per unit volume of the positive electrode active material in an absolutely dense state, which is detected by, for example, but not limited to, an impregnation method, and a gas volumetric method.

In this embodiment, the true density of the positive electrode active material is higher than a specific standard, so that the positive electrode active material has a high energy density.

In a second aspect, an embodiment of the present application provides a positive electrode plate 221, including the positive electrode plate 221 according to the above embodiments.

In a third aspect, an embodiment of the present application provides a secondary battery 20, comprising the positive electrode plate 221 according to the above embodiments.

In a fourth aspect, an embodiment of the present application further provides an electrical device, comprising the secondary battery 20 according to the above embodiments.

In a fifth aspect, an embodiment of the present application provides a preparation method for the positive electrode active material as described in the above embodiments. Referring to FIG. 5, the preparation method includes heating a solution containing transition metal salts to form a carbonate core; performing a precipitation reaction on the surface of the carbonate core so as to obtain a precursor having a carbonate-containing core and a hydroxide-containing shell; and mixing the precursor, a lithium salt, a material containing element A (referred to A-source) and a raw material containing element M (referred to M-source), and sintering to obtain hollow secondary particles.

In the solution containing transition metal salts, the type of transition metal may be blended according to the chemical formula of the hollow secondary particles. For example, the salts of nickel, cobalt and manganese are regulated in such a way that the nickel, cobalt, and manganese elements satisfy specific molar ratios, where the cobalt and manganese may each independently have a molar percent of 0.

In the process of heating the solution containing transition metal salts to form a carbonate core, for example, a carbonate solution with a certain concentration is used as a first-stage precipitant, ammonia with a certain concentration is used as a complexing agent, and the carbonate core with a loose structure is formed by heating under a protective gas, with stirring reaction for a period of time.

In the process of precipitation reaction on the surface of the carbonate core, for example, the precipitant is replaced with a sodium hydroxide solution as a second-stage precipitant to continue the precipitation reaction. Then, after washing, filtering and drying, a precursor having a core containing loose carbonate and a shell containing dense hydroxide is obtained.

It should be noted that, in the process of mixing the precursor, a lithium salt, a material containing element A, and a raw material containing element M, the lithium salt includes one or more of lithium carbonate and lithium hydroxide; when the molar coefficient q of the element A in the chemical formula of the hollow secondary particles is 0, the amount of the material containing element A is 0; when the molar coefficient p of the element M in the chemical formula of the hollow secondary particles is 0, the amount of the material containing element M is 0.

In some embodiments, at least one of the following conditions (e1) to (e3) is satisfied: (e1) the pH value of the solution containing transition metal salts is 10.5-12; (e2) the time for heating the solution containing transition metal salts is 14-25 h; (e3) the time for the precipitation reaction is 20-28 h; and (e4) a molar ratio of the precursor to the lithium salt is 1:(1-1.2).

With respect to condition (e1), the pH value of the solution containing transition metal salts is, for example, but not limited to, a point value of any one of 10.5, 11, 11.5, and 12, or a range value between any two thereof.

With respect to condition (e2), the time for heating the solution containing transition metal salts is, for example, but not limited to, any one of 14 h, 15 h, 16 h, 17 h, 18 h, 19 h, 20 h, 21 h, 22 h, 23 h, 24 h, and 25 h, or a range value between any two thereof.

Optionally, in the process of heating the solution containing transition metal salts, the heating temperature ranges from 30 to 80° C., with stirring at a rotational speed of 200 to 800 rpm.

With respect to condition (e3), the time for the precipitation reaction is, for example, but not limited to, any one of 20 h, 21 h, 22 h, 23 h, 24 h, 25 h, 26 h, 27 h, and 28 h, or a range value between any two thereof.

Optionally, during the precipitation reaction, the pH value of the system is 11.2-12.8, and the heating temperature is 30-80° C., with stirring at a speed of 400-900 rpm.

With respect to condition (e4), the molar ratio of the precursor to the lithium salt is, for example, but not limited to, a point value of any one of 1:1, 1:1.05, 1:1.1, 1:1.15, and 1:1.2, or a range value between any two thereof.

Optionally, in an embodiment of the present application, in the process of sintering to obtain the hollow secondary particles, the sintering temperature is 700-950° C., and the sintering time is 9-14 h.

In this embodiment, when at least one of the pH value of the solution containing the transition metal salts, the time for heating the solution containing the transition metal salts, and the time for the precipitation reaction to occur meets specific requirements, it is beneficial to form a positive electrode active material in which the ratio k of the cavity diameter of the hollow secondary particles to the volume average particle size meets an appropriate range; a suitable mass ratio of the precursor to the lithium salt is conducive to regulating the residual alkali content in the positive electrode active material.

Referring to FIG. 6, in some embodiments, especially in an embodiment where the positive electrode active material further includes a coating layer, as an example, the preparation method for the positive electrode active material further includes mixing the hollow secondary particles with a raw material of a coating layer, and sintering to obtain a positive electrode active material having the coating layer distributed on at least a part of the surface of the hollow secondary particles.

Optionally, in an embodiment of the present application, in the process of sintering to obtain the positive electrode active material having the coating layer distributed on at least a part of the surface of the hollow secondary particles, the sintering temperature is 350-500° C., and the sintering time is 4-8 h.

In this embodiment, the coating layer is formed on at least a part of the surface of the hollow secondary particles, the coating layer can reduce the contact area between the hollow secondary particles and an electrolyte, and can reduce side reactions between the hollow secondary particles and the electrolyte, thereby facilitating the improvement of cycling performance.

Some specific examples are listed below to better illustrate the present application.

I. Preparation of Secondary Battery (1) Preparation of Positive Electrode Active Material

EXAMPLE 1

1) Corresponding transition metal salts were weighed according to a molar ratio of nickel, cobalt and manganese elements as 3:3:3 to prepare a solution containing transition metal salts, the total metal concentration of the solution containing the transition metal salts being 2 mol/L, and the addition rate being 12L/h. 1.6 mol/L sodium carbonate solution was prepared as a first-stage precipitant, which was added at a rate of 20L/h; ammonia with a mass concentration of 25% was added as a complexing agent at a rate of 2L/h; the three solutions were added into a reactor containing 95L of deionized water at 50° C. under the atmosphere of nitrogen protection, followed by controlling the stirring speed to be 450 rpm, adjusting the reaction pH until it was stabilized at 11.5, and continuously stirring for reaction for 18 h, to obtain a carbonate core having a loose structure.

2) 4.5 mol/L sodium hydroxide solution was used as a second-stage precipitant, which was added at a speed controlled to be 9 L/h, the reaction pH was adjusted to be 11.8, reaction with stirring at a speed of 600 rpm was performed for 26 h at 50° C. under the atmosphere of nitrogen protection, aging was performed for 2 h, followed by washing, filtering, and drying, to obtain a precursor with a loose carbonate as the core, and a dense hydroxide as the shell.

3) The obtained precursor, lithium hydroxide (LiOH) and titanium oxide ($TiO_2$) were weighed according to a molar ratio of 1:1.15:0.001, tungsten trioxide ($WO_3$) that is 0.65 wt % of the mass of the precursor was then added, mixed and stirred uniformly, and then heated up to 900° C. at a temperature increase rate of 2° C./min in an atmosphere of air or oxygen, held for 12 h, and then naturally cooled to room temperature, to obtain hollow secondary particles after primary sintering.

4) The hollow secondary particles after primary sintering, element Al (from $\gamma\text{-}Al_2O_3$) and element B (from $H_3BO_3$) were mixed uniformly according to a mass ratio of 1:0.004:0.002, the mixture was heat to 450° C. at a heating rate of 2° C./min and held for 6 h, and then naturally cooled to room temperature, to obtain a positive electrode active material with a coating layer.

EXAMPLES 2-5

The difference from Example 1 was that the pH value and the heating and stirring reaction time of the solution containing transition metal salts in step (1) were different, and the positive electrode active materials with different k values of the hollow secondary particles were obtained.

EXAMPLES 6-8

The difference from Example 1 was that the heating and stirring reaction time in step 1) was different; the precipitation reaction time in step (2) was different, and the positive electrode active materials with different volume average particle sizes Dv50 of the hollow secondary particles were obtained.

EXAMPLES 9-11

The difference from Example 1 was that the molar ratios of nickel, cobalt and manganese elements added in step (1) were different, and in step (3), the sintering temperatures were modified to 830° C., 850° C., and 890° C. respectively.

EXAMPLE 12

The difference from Example 1 was that the heating and stirring reaction time in step (1) was different from the heating and stirring time in step (2).

EXAMPLES 13-14

The difference from Example 1 was that the pH values of the solutions containing the transition metal salts in step (1) were different, which were 10.0 and 9.5 respectively.

EXAMPLES 15-16

The difference from Example 1 was that the molar ratios of the precursor added in step (3) to titanium oxide ($TiO_2$) were different, which were 1:0.02 and 1:0.01, respectively.

EXAMPLES 17-18

The difference from Example 1 was that the titanium oxide ($TiO_2$) added in step (3) was replaced with zirconium oxide ($ZrO_2$) and yttrium oxide ($Y_2O_3$) respectively.

EXAMPLES 19-21

The difference from Example 1 was that the content of the M-source ($WO_3$) added in step (3) was changed to 1.5 wt %, 1.0 wt % and 0.1 wt % respectively.

EXAMPLES 22-24

The difference from Example 1 was that the M-source (WO3) added in step (3) was replaced with oxidized $Nb_2O_5$, $MoO_3$ and $ZrO_2$, respectively.

EXAMPLE 25

The difference from Example 1 was that the material containing element A was not added in step (2).

EXAMPLES 26-27

The difference from Example 1 was that the molar ratios of the precursor material added in step (3) to lithium hydroxide were 1:1.18, 1:1.13, respectively.

EXAMPLE 28

The difference from Example 1 was that the sintering temperature in step (3) was 800° C.

EXAMPLE 29

The difference from Example 1 was that the sinterijng temperature in step (3) was 1000° C.

EXAMPLE 30

The difference from Example 1 was that the molar ratio of precursor material added in step (3) to lithium hydroxide was 1:1.

EXAMPLES 31-41

The difference from Example 1 was that the amount and proportion of the element Al (derived from γ-$Al_2O_3$) and the element B (derived from $H_3BO_3$) added in step (4) were different.

Comparative Example 1

The difference from Example 1 was that the material containing element M was not added in step (2).

Comparative Example 2

The difference from Example 1 was that, in step (1), 1 wt % of $(NH_4)_6$ $W_7O_{24}$ was simultaneously mixed into the transition metal salts, in preparation step (2), no material containing element M was added, and the sintering temperature was changed to 850° C. to avoid segregation of the element M during the sintering process and ensure that the element M was mainly present in the bulk-phase.

The above description of the various examples and comparative examples tends to emphasize the differences between the various examples and comparative examples, the similarities or likenesses of which can be cross-referenced and will not be repeated herein for the sake of brevity.

(2) Preparation of Positive Electrode Plate

A positive electrode slurry was prepared from the positive electrode active material obtained above, a conductive agent (super-P), carbon nanotubes (CNT), and polyvinylidene fluoride (PVDF) at a mass ratio of 94:1.5:0.5:3, and was coated on an Al foil of 13 μm, followed by vacuum drying at 120° C., cold pressing, cutting and slitting, to obtain a positive electrode plate.

(3) Preparation of Negative Electrode Plate

A negative electrode slurry was prepared from a graphite negative electrode material, a conductive agent (Super P), a binder (SBR), and a thickener (CMC-Na) at a mass ratio of 96.2:0.8:1.8:1.2, was coated on a copper foil of 8 μm, followed by vacuum drying at 120° C., cold pressing, cutting and slitting, to obtain a negative electrode plate.

(4) Battery Assembly

The positive electrode plate, a separator, and the negative electrode plate were stacked in order, where the separator between the positive and negative electrodes played a role in isolation, and the positive electrode plate, the separator and the negative electrode were coiled and placed in an outer package which was then injected with a prepared electrolyte, followed by encapsulating, injection, formation, gas discharge and other processes, to obtain a lithium-ion battery.

It can be understood by those skilled in the art that in the above methods of the specific examples and comparative examples, the drafting order of various steps does not indicate a strict performing order to constitute any limitation on the implementation process. The specific order of performing the various steps should be determined by the functions thereof and the possible internal logic.

II. Testing Method

1) Gram Capacity Test

A button cell was assembled from the positive electrode plate prepared as in "I. Preparation of secondary battery" as a positive electrode and a lithium plate as a negative electrode. At a temperature of 25° C., the charge and discharge capacity at 2.8-4.2V was tested at a current density of 1C rate.

Moreover, the Coulombic efficiency was calculated based on the charge and discharge capacity, and the first-cycle Coulombic efficiency=first-cycle discharge capacity/first-cycle charge capacity ×100%.

2) Power Performance Test

At a temperature of 25° C., a lithium-ion battery prepared as in "I. Preparation of secondary battery" was fully charged at a current density of 1C, and then discharged at a current density of 1C and 20C, respectively. The discharge capacity of the lithium-ion battery was tested with the capacity of 1C as a reference to obtain the capacity retention rate of the lithium-ion battery. 20C capacity retention rate=20C capacity retention rate/1C discharge capacity×100%.

3) Cycling Performance Test

At a temperature of 25° C., the lithium-ion battery prepared as in "I. Preparation of secondary battery" was subjected to a charge and discharge cycle test at a current density of 5C, with a voltage range set to 2.8-4.2V. Capacity retention rate=first-cycle discharge specific capacity/discharge capacity after 1000 cycles×100%.

4) Chemical Composition Test

Determination of molecular formula: the molecular formula of the hollow secondary particles was determined by the method of ICP emission spectroscopy.

Detection of mass content of $Li_2CO_3$ and mass content of LiOH: the general method for determining acidity and alkalinity of chemical reagents (GB/T 9724-2007) may be used for determination. A dilute hydrochloric acid solution was used as a titrant for automatic two-step potentiometric titration of a filtrate; firstly, the following reaction occurred: $LiOH+HCl=LiCl+H_2O$, $Li_2CO_3+HCl=LiHCO_3+LiCl$, with the continuous addition of the dilute hydrochloric acid solution, all the lithium hydroxide would be transformed into lithium chloride and water, all the $Li_2CO_3$ would be transformed into lithium bicarbonate and lithium chloride, at this point, the pH value was about 4.0-5.0, and a potentiometric titrator displayed electrode potential jump point EP1; with the dilute hydrochloric acid continue to add, $LiHCO_3+HCl=LiCl+CO_2\uparrow+H_2O$, at this point, the pH value was about 8.0-9.0, and the potentiometric titrator displayed electrode potential jump point EP2. The content of $Li_2CO_3$ and LiOH in a sample could be calculated on the basis of the consumptions of dilute hydrochloric acid corresponding to EP1 and EP2.

III. Experimental Conditions and Test Results

Figure 8:
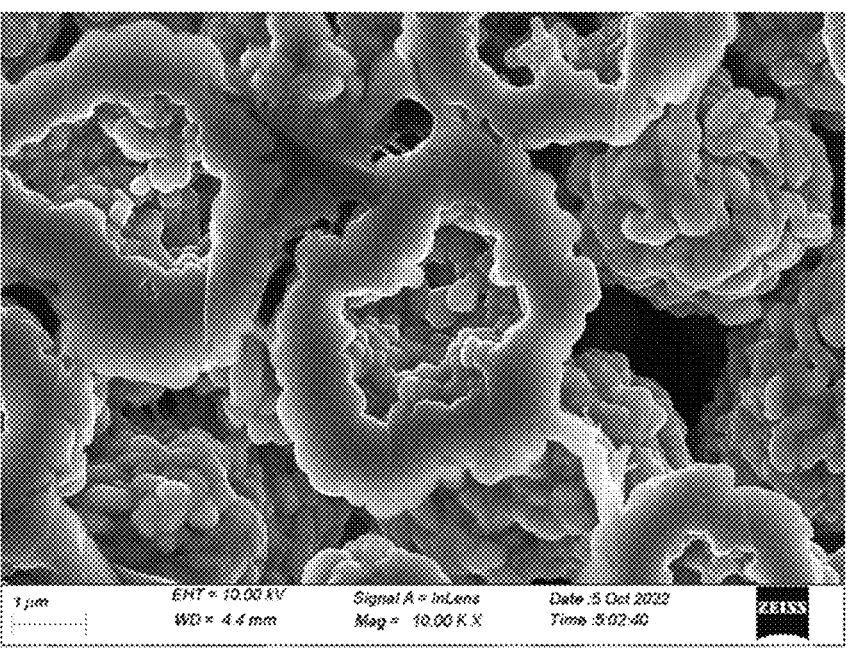
FIG. 8 is an SEM image of the cross section of the positive electrode active material prepared in Example 1 of the present application.
Figure 9:
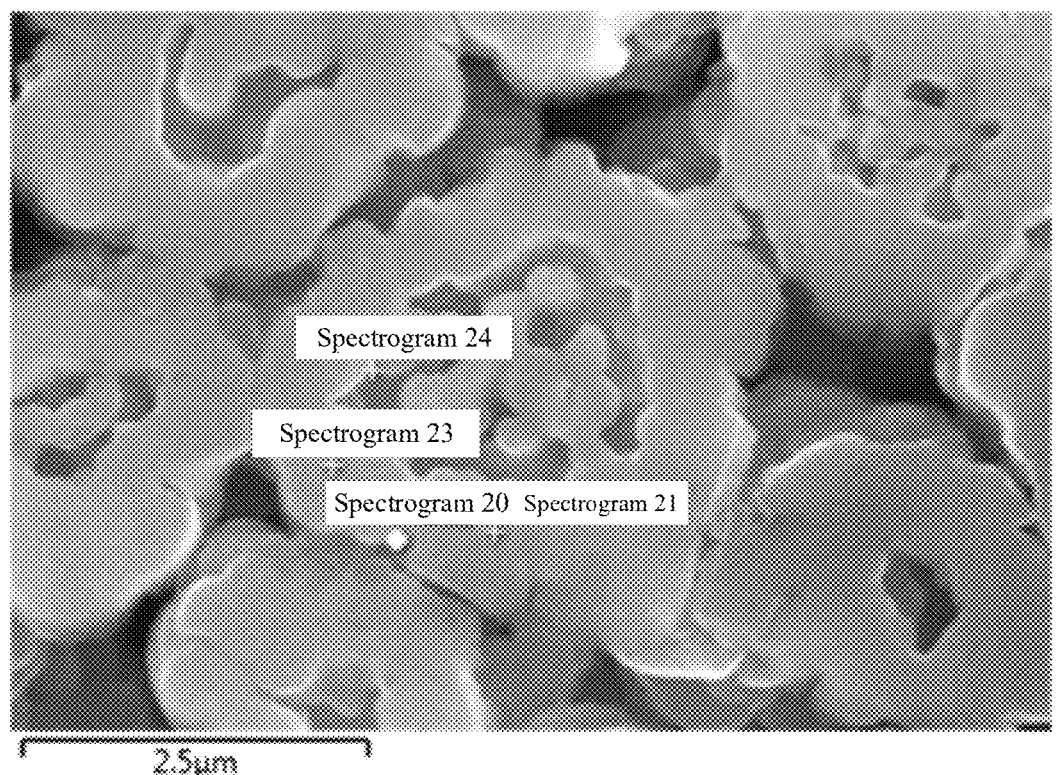
FIG. 9 is another SEM image of the positive electrode active material prepared in Example 1 of the present application.
Figure 10:
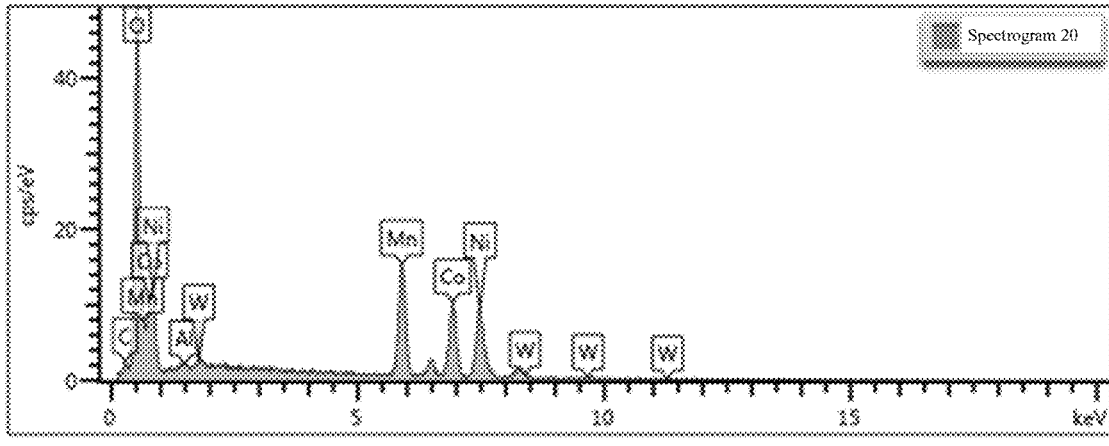
FIG. 10 is an energy spectrum diagram at the site of spectrogram 20 in FIG. 9.

The main experimental conditions and test results in each experimental group are shown in Tables 1-3 and FIGS. 8-10. For experimental conditions not described, refer to the foregoing description of the specific embodiments and comparative examples, which will not be repeated herein.

TABLE 1.1

|  |  |  | | Step (1) Parameters | |
| Item | Molecular formula of hollow secondary particles | pH value | Reaction time/h | Nickel, cobalt and manganese molar ratio | Step (2) Parameters Time/h |
|---|---|---|---|---|---|
| Example 1 | $Li_{1.07}Ni_{0.333}Co_{0.333}Mn_{0.332}Ti_{0.001}W_{0.003}O_2$ | 11.5 | 18 | 3:3:3 | 24 |
| Example 2 | $Li_{1.09}Ni_{0.332}Co_{0.334}Mn_{0.331}Ti_{0.001}W_{0.003}O_2$ | 11 | 18 | 3:3:3 | 24 |
| Example 3 | $Li_{1.07}Ni_{0.333}Co_{0.334}Mn_{0.331}Ti_{0.001}W_{0.003}O_2$ | 10.5 | 18 | 3:3:3 | 24 |
| Example 4 | $Li_{1.10}Ni_{0.333}Co_{0.331}Mn_{0.33}4Ti_{0.001}W_{0.003}O_2$ | 11.5 | 16 | 3:3:3 | 24 |
| Example 5 | $Li_{1.09}Ni_{0.333}Co_{0.330}Mn_{0.334}Ti_{0.001}W_{0.003}O_2$ | 11.5 | 14 | 3:3:3 | 24 |
| Example 6 | $Li_{1.11}Ni_{0.330}Co_{0.337}Mn_{0.331}Ti_{0.001}W_{0.003}O_2$ | 11.5 | 24 | 3:3:3 | 28 |
| Example 7 | $Li_{1.07}Ni_{0.333}Co_{0.333}Mn_{0.331}Ti_{0.001}W_{0.003}O_2$ | 11.5 | 20 | 3:3:3 | 26 |
| Example 8 | $Li_{1.08}Ni_{0.334}Co_{0.332}Mn_{0.331}Ti_{0.001}W_{0.003}O_2$ | 11.5 | 16 | 3:3:3 | 20 |
| Example 9 | $Li_{1.09}Ni_{0.502}Co_{0.296}Mn_{0.200}Ti_{0.001}W_{0.003}O_2$ | 11.5 | 18 | 5:3:2 | 24 |
| Example 10 | $Li_{1.07}Ni_{0.503}Co_{0.203}Mn_{0.291}Ti_{0.001}W_{0.003}O_2$ | 11.5 | 18 | 5:2:3 | 24 |
| Example 11 | $Li_{1.07}Ni_{0.597}C_{o0.203}Mn_{0.194}Ti_{0.001}W_{0.003}O_2$ | 11.5 | 18 | 6:2:2 | 24 |
| Example 12 | $Li_{1.08}Ni_{0.333}Co_{0.331}Mn_{0.334}Ti_{0.001}W_{0.003}O_2$ | 11.5 | 26 | 3:3:3 | 16 |
| Example 13 | $Li_{1.11}Ni_{0.330}Co_{0.334}Mn_{0.334}Ti_{0.001}W_{0.003}O_2$ | 10 | 18 | 3:3:3 | 24 |
| Example 14 | $Li_{1.07}Ni_{0.332}Co_{0.334}Mn_{0.333}Ti_{0.001}W_{0.003}O_2$ | 9.5 | 18 | 3:3:3 | 24 |

TABLE 1.2

| | Positive electrode active material | | | | | |
| | Hollow secondary particle | | Residual alkali content | | True | Power | Cycling performance Capacity retention ratio after |
| Item | Dv50/μm | k value | $Li_2CO_3$/ wt % | LiOH/ wt % | density g/cm³ | performance 20 C./% | 1000 cycles at 25° C./% |
|---|---|---|---|---|---|---|---|
| Example 1 | 3 | 0.72 | 0.3 | 0.09 | 4.798 | 97.0 | 96.5 |

TABLE 1.2-continued

| | Positive electrode active material | | | | | | |
| | Hollow secondary particle | | Residual alkali content | | True | Power | Cycling performance Capacity retention ratio after |
| Item | Dv50/μm | k value | $Li_2CO_3$/ wt % | LiOH/ wt % | density g/cm$^3$ | performance 20 C./% | 1000 cycles at 25° C./% |
|------|---------|---------|---------|--------|--------|--------|--------|
| Example 2 | 3.1 | 0.65 | 0.29 | 0.12 | 4.645 | 96.8 | 95.4 |
| Example 3 | 3 | 0.53 | 0.31 | 0.08 | 4.638 | 96.3 | 96.3 |
| Example 4 | 3.2 | 0.61 | 0.28 | 0.09 | 4.667 | 96.4 | 96.0 |
| Example 5 | 3.1 | 0.56 | 0.29 | 0.007 | 4.651 | 95.9 | 95.9 |
| Example 6 | 5 | 0.73 | 0.33 | 0.11 | 4.764 | 93.8 | 93.7 |
| Example 7 | 4.2 | 0.71 | 0.31 | 0.12 | 4.725 | 94.8 | 94.9 |
| Example 8 | 2.2 | 0.69 | 0.33 | 0.08 | 4.793 | 95.7 | 96.8 |
| Example 9 | 2.9 | 0.75 | 0.27 | 0.11 | 4.724 | 97.3 | 95.3 |
| Example 10 | 3.3 | 0.76 | 0.29 | 0.13 | 4.708 | 97.0 | 93.4 |
| Example 11 | 3.2 | 0.7 | 0.32 | 0.12 | 4.675 | 96.7 | 92.9 |
| Example 12 | 3.3 | 0.87 | 0.33 | 0.11 | 4.812 | 95.3 | 89.8 |
| Example 13 | 3.1 | 0.36 | 0.33 | 0.08 | 4.713 | 86.6 | 94.3 |
| Example 14 | 2.9 | 0.13 | 0.31 | 0.07 | 4.683 | 83.7 | 95.3 |

TABLE 2.1

| | Preparation process parameters | | | | | |
| Item | Molecular formula of hollow secondary particles | A- source | Molar ratio of element A | M- source | Molar ratio of precursor to lithium salt | Additive amount of M-source/ wt % | Step (3) Sintering temperature/ ° C. |
|------|------|------|------|------|------|------|------|
| Example 1 | $Li_{1.07}Ni_{0.333}Co_{0.333}Mn_{0.332}Ti_{0.001}W_{0.003}O_2$ | $TiO_2$ | 0.001 | $WO_3$ | 1:1.15 | 0.65 | 900 |
| Example 15 | $Li_{1.11}Ni_{0.335}Co_{0.331}Mn_{0.314}Ti_{0.02}W_{0.003}O_2$ | $TiO_2$ | 0.02 | $WO_3$ | 1:1.15 | 0.65 | 900 |
| Example 16 | $Li_{1.06}Ni_{0.335}Co_{0.333}Mn_{0.322}Ti_{0.01}W_{0.003}O_2$ | $TiO_2$ | 0.01 | $WO_3$ | 1:1.15 | 0.65 | 900 |
| Example 17 | $Li_{1.07}Ni_{0.334}Co_{0.333}Mn_{0.330}Zr_{0.001}W_{0.003}O_2$ | $ZrO_2$ | 0.001 | $WO_3$ | 1:1.15 | 0.65 | 900 |
| Example 18 | $Li_{1.09}Ni_{0.333}Co_{0.333}Mn_{0.332}Y_{0.001}W_{0.003}O_2$ | $Y_2O_3$ | 0.001 | $WO_3$ | 1:1.15 | 0.65 | 900 |
| Example 19 | $Li_{1.14}Ni_{0.333}Co_{0.333}Mn_{0.332}Ti_{0.001}W_{0.007}O_2$ | $TiO_2$ | 0.001 | $WO_3$ | 1:1.15 | 1.5 | 900 |
| Example 20 | $Li_{1.10}Ni_{0.332}Co_{0.332}Mn_{0.334}Ti_{0.001}W_{0.004}O_2$ | $TiO_2$ | 0.001 | $WO_3$ | 1:1.15 | 1 | 900 |
| Example 21 | $Li_{1.08}Ni_{0.333}Co_{0.333}Mn_{0.332}Ti_{0.001}W_{0.0005}O_2$ | $TiO_2$ | 0.001 | $WO_3$ | 1:1.15 | 0.1 | 900 |
| Example 22 | $Li_{1.09}Ni_{0.334}Co_{0.333}Mn_{0.330}Ti_{0.001}Nb_{0.0025}O_2$ | $TiO_2$ | 0.001 | $Nb_2O_5$ | 1:1.15 | 0.65 | 900 |
| Example 23 | $Li_{1.08}Ni_{0.330}Co_{0.333}Mn_{0.335}Ti_{0.001}Mo_{0.0045}O_2$ | $TiO_2$ | 0.001 | $MoO_3$ | 1:1.15 | 0.65 | 900 |
| Example 24 | $Li_{1.11}Ni_{0.335}Co_{0.333}Mn_{0.330}Ti_{0.001}Zr_{0.005}O_2$ | $TiO_2$ | 0.001 | $ZrO_2$ | 1:1.15 | 0.65 | 900 |
| Example 25 | $Li_{1.09}Ni_{0.334}Co_{0.331}Mn_{0.333}W_{0.003}O_2$ | / | / | $WO_3$ | 1:1.15 | 0.65 | 900 |
| Example 26 | $Li_{1.16}Ni_{0.334}Co_{0.335}Mn_{0.330}Ti_{0.001}W_{0.003}O_2$ | $TiO_2$ | 0.001 | $WO_3$ | 1:1.18 | 0.65 | 900 |
| Example 27 | $Li_{1.03}Ni_{0.330}Co_{0.333}Mn_{0.336}Ti_{0.001}W_{0.003}O_2$ | $TiO_2$ | 0.001 | $WO_3$ | 1:1.13 | 0.65 | 900 |
| Example 28 | $Li_{1.15}Ni_{0.332}Co_{0.333}Mn_{0.334}Ti_{0.001}W_{0.003}O_2$ | $TiO_2$ | 0.001 | $WO_3$ | 1:1.15 | 0.65 | 800 |
| Example 29 | $Li_{1.00}Ni_{0.336}Co_{0.330}Mn_{0.332}Ti_{0.001}W_{0.003}O_2$ | $TiO_2$ | 0.001 | $WO_3$ | 1:1.15 | 0.65 | 1000 |
| Example 30 | $Li_{0.95}Ni_{0.335}Co_{0.331}Mn_{0.332}Ti_{0.001}W_{0.003}O_2$ | $TiO_2$ | 0.001 | $WO_3$ | 1:10 | 0.65 | 900 |
| Comparative Example 1 | $Li_{1.03}Ni_{0.334}Co_{0.334}Mn_{0.331}Ti_{0.001}O_2$ | $TiO_2$ | 0.001 | / | 1:1.15 | / | 900 |
| Comparative Example 2 | $Li_{1.04}Ni_{0.333}Co_{0.333}Mn_{0.332}Ti_{0.001}W_{0.001}O_2$ | $TiO_2$ | 0.001 | $(NH_4)_6W_7O_{24}$ | 1:1.15 | Bulk phase | 900 |

TABLE 2.2

| | Positive electrode active material | | | |
| Item | Residual alkali content Li$_2$CO$_3$/ wt % | LiOH/ wt % | Power performance 20 C/% | Cycling performance Capacity retention ratio after 1000 cycles at 25° C./% |
|---|---|---|---|---|
| Example 1 | 0.30 | 0.09 | 97.0 | 96.5 |
| Example 15 | 0.29 | 0.08 | 94.0 | 93.7 |
| Example 16 | 0.30 | 0.10 | 95.3 | 94.2 |
| Example 17 | 0.28 | 0.10 | 97.3 | 96.3 |
| Example 18 | 0.31 | 0.09 | 97.1 | 95.9 |
| Example 19 | 0.31 | 0.10 | 92.5 | 91.1 |
| Example 20 | 0.29 | 0.08 | 93.3 | 92.4 |
| Example 21 | 0.30 | 0.10 | 93.6 | 93.7 |
| Example 22 | 0.31 | 0.09 | 95.7 | 94.3 |
| Example 23 | 0.32 | 0.10 | 94.8 | 95.4 |
| Example 24 | 0.31 | 0.11 | 95.2 | 96.0 |
| Example 25 | 0.32 | 0.11 | 92.3 | 93.3 |
| Example 26 | 0.51 | 0.28 | 92.4 | 89.5 |
| Example 27 | 0.21 | 0.07 | 93.7 | 92 |
| Example 28 | 0.46 | 0.26 | 92.1 | 88.6 |
| Example 29 | 0.09 | 0.08 | 87.9 | 88.8 |
| Example 30 | 0.04 | 0.04 | 83.3 | 85.7 |
| Comparative Example 1 | 0.29 | 0.09 | 80.5 | 83.6 |
| Comparative Example 2 | 0.35 | 0.13 | 82.1 | 84.4 |

Herein, the molar ratio of the element A refers to its molar proportion in the mixed material in step (3).

TABLE 3

| Item | Step (4) Mass ratio of primary-sintered powder, element Al and element B | Mass ratio of Al to B | Ratio of total content of elements Al and B to mass of positive electrode active material wt % | Gram capacity of positive electrode active material mAh/g, 1 C. | Power performance 20 C./% | Cycling performance Capacity retention ratio after 1000 cycles at 25° C./% |
|---|---|---|---|---|---|---|
| Example 1 | 1:0.004:0.002 | 2:1 | 0.59 | 160.1 | 97.0 | 96.5 |
| Example 31 | 1:0.03:0.015 | 2:1 | 4.31 | 153.6 | 91.1 | 92.3 |
| Example 32 | 1:0.02:0.01 | 2:1 | 2.91 | 155.8 | 93.7 | 93.5 |
| Example 33 | 1:0.012:0.006 | 2:1 | 0.71 | 157.3 | 95.2 | 93.7 |
| Example 34 | 1:0.008:0.004 | 2:1 | 1.19 | 158.1 | 96.0 | 93.9 |
| Example 35 | 1:0.002:0.001 | 2:1 | 0.30 | 158.9 | 91.6 | 90.1 |
| Example 36 | 1:0.005:0.001 | 5:1 | 0.60 | 159.1 | 93.6 | 96.3 |
| Example 37 | 1:0.0045:0.0015 | 3:1 | 0.60 | 159.7 | 94.2 | 95.1 |
| Example 38 | 1:0.003:0.003 | 1:1 | 0.60 | 159.4 | 95.8 | 92.9 |
| Example 39 | 1:0.006:0 | / | 0.60 | 158.7 | 91.4 | 94.1 |
| Example 40 | 1:0:0.006 | / | 0.60 | 158.9 | 93.4 | 88.1 |
| Example 41 | 1:0:0 | / | 0 | 159.4 | 85.9 | 86.5 |

Figure 7:
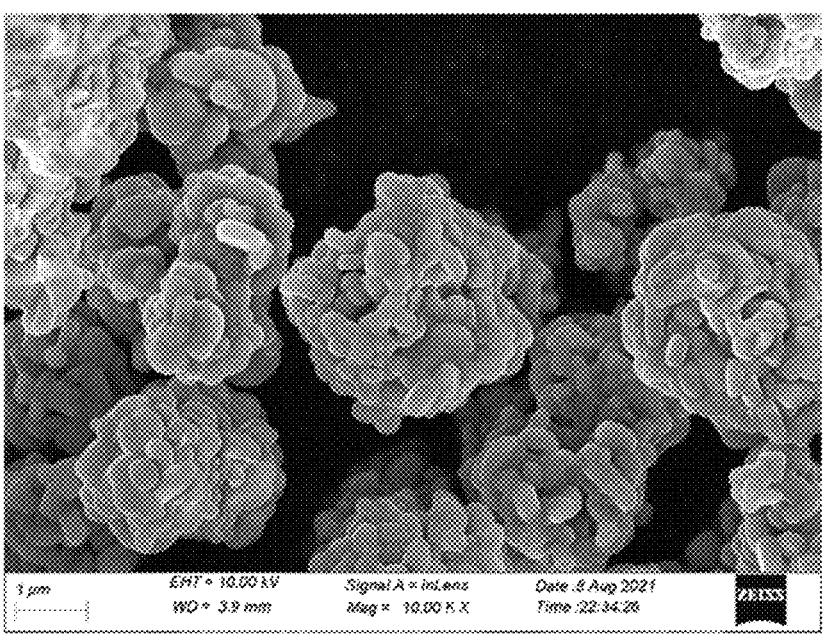
FIG. 7 is an SEM image of the surface of a positive electrode active material prepared in Example 1 of the present application.

FIG. 7 is an SEM image of the surface of a positive electrode active material prepared in Example 1 of the present application. It can be seen from FIG. 7 that the positive electrode active material prepared in Example 1 presents a polycrystalline particle morphology composed of a plurality of primary small particles.

FIG. 8 is an SEM image of the cross section of the positive electrode active material prepared in Example 1 of the present application. It can be seen from FIG. 8 that the positive electrode active material prepared in Example 1 is of a hollow structure.

The positive electrode active material presents a polycrystalline particle morphology composed of a plurality of primary small particles, and has good sphericity and roundness.

FIG. 9 is another SEM image of the positive electrode active material prepared in Example 1 of the present application; FIG. 10 is an energy spectrum diagram at the site of spectrogram 20 in FIG. 9 (the site of spectrogram 20 was used as an example, and the other sites were analyzed using the same method).

With reference to FIGS. 9 and 10 together, the weight percent, weight percent variance and atomic percent of the element M corresponding to each site in the cross-section of the anode active material are shown in Table 4.

TABLE 4

| Spectrogram site | Location | Wt % | Wt % Sigma | Atomic percent |
|---|---|---|---|---|
| 20 | External grain boundary | 1.42 | 0.30 | 0.21 |
| 21 | Intermediate grain boundary | 1.66 | 0.32 | 0.26 |
| 23 | Bulk phase of primary particles | 0.52 | 0.30 | 0.08 |
| 24 | Internal grain boundary | 0.83 | 0.30 | 0.13 |

According to Table 4, it can be seen that in the positive active material prepared in Example 1 of the present application, the content of the element M at the grain boundaries is greater than the content within the bulk-phase part of the primary particles.

Combined with the above Tables 1 to 3, the brief analysis is as follows:

In Examples 1-14

In Examples 1-11, by controlling the pH value of the solution containing transition metal salts, the time for heating the solution containing transition metal salts and the time for the precipitation reaction to be suitable in the preparation process, the k value of the obtained hollow secondary particles could be regulated in the range of 0.5-0.8 well; in Example 12, the time for heating the solution containing transition metal salt was relatively long and the time for the precipitation reaction was relatively short, and the obtained hollow secondary particles had a relatively high k value; in Examples 13 and 14, the pH value of the solution containing transition metal salts was relatively low, and the k value of the obtained hollow secondary particles was relatively low.

As seen from the comparison between Example 12 and Examples 1-5, the volume average particle size Dv50 of the hollow secondary particles was similar, the k value of the hollow secondary particles in Example 12 was relatively high, and Examples 1-5 achieved higher power performance and cycling performance.

As seen from the comparison between Examples 13-14 and Examples 1-5, the volume average particle size Dv50 of the hollow secondary particles was similar, the k value of the hollow secondary particles in Examples 13-14 was relatively low, and Examples 1-5 achieved higher power performance and cycling performance.

As seen from the comparison between Examples 6-8 and Examples 1-5, the k value of the hollow secondary particles was similar, the volume average particle size Dv50 of the hollow secondary particles in Examples 1-5 was in the range of 2.5-3.5 μm, the volume average particle size Dv50 of the hollow secondary particles in Examples 6-8 was out of the range of 2.5-3.5 μm, and Examples 1-5 achieved higher power performance and cycling performance.

As seen from the comparison between Examples 9-11 and Examples 1-5, the main difference was that the nickel-cobalt-manganese ratio was different, and each of the examples achieved good power performance and cycling performance.

In Example 1 and Examples 15-27

As seen from the comparison between Examples 1, 15 and 16 and Example 25, an appropriate amount of A-source was added in Examples 1, 15 and 16, and the power performance and the cycling performance were both improved. As seen from the comparison between Example 1 and Examples 15 and 16, the addition amount of the A-source in Examples 15 and 16 was relatively high and Example 1 achieved better cycling performance and power performance.

As seen from the comparison between Example 1 and Examples 17 and 18, different A-sources were used, and each of the examples achieved good power performance and cycling performance.

As seen from the comparison between Examples 1, 19 and 21 and Comparative Example 1, an appropriate amount of M-A-source and an appropriate amount of residual alkali were added in Examples 1, 19 and 21, and the power performance and the cycling performance were both improved.

As seen from the comparison between Example 1 and Examples 22-24, different M-sources were used, and each of the examples achieved good power performance and cycling performance.

As seen from the comparison between Example 1 and Example 2, the M-source was more distributed at the grain boundaries in Example 1, the M source was bulk doped in Example 27, and better coordination with the appropriate amount of residual alkali could be achieved in Example 1, thereby achieving better power performance and cycling performance.

In Example 1 and Examples 26-30

As seen from the comparison between Example 1 and Example Examples 26-30, the lithium salt ratio and the sintering temperature would affect the residual alkali content in the positive electrode active material.

The positive electrode active materials in Example 1 and Example Examples 26-29 all contained a certain amount of $Li_2CO_3$ and LiOH, which could be well coordinated with the element M, and both the power performance and cycling performance were significantly improved.

As seen from the comparison between Example 30 and Example 1, the content of $Li_2CO_3$ was low in Example 30, and Example 1 achieved better power performance and cycling performance.

In Example 1 and Examples 31-41

As seen from the comparison between Examples 1, 31-40 and Example 41, there was no coating layer in Example 41, and Examples 1, 31-40 achieved better power performance and cycling performance.

As seen from the comparison between Examples 1, 37 and 38 and Examples 39 and 40, the coating layer in Example 39 contained Al but not B, the coating layer in Example 40 contained B but not Al, the coating layers in Example 1, 37 and 38 contained Al and B, Example 1, 37 and 38 achieved better power performance as compared to Example 39, and Example 1, 37 and 38 achieved better cycling performance as compared to Example 40.

As seen from the comparison between Example 1 and Examples 31-32, the content of the coating layer in Examples 33 and 34 was relatively high, and Example 1 achieved higher gram capacity and power performance.

As seen from the comparison between Example 1 and Examples 36-38, Al and B in Example 1 had a more suitable mass ratio, and Example 1 achieved higher gram capacity and power performance.

Finally, it should be noted that the above Examples are merely used for illustrating rather than limiting the technical solutions of the present application. Although the present application has been described in detail with reference to the above various Examples, those of ordinary skill in the art should understand that the technical solutions specified in the above various Examples may still be modified, or some or all of the technical features therein may be equivalently substituted; and such modifications or substitutions do not make the essence of the corresponding technical solutions depart from the scope of the technical solutions of the various Examples of the present application, which shall fall within the scope of the claims and the specification of the present application. In particular, the technical features mentioned in the various embodiments can be combined in any manner as long as there is no structural conflict. The present application is not limited to the particular embodiments disclosed herein, but rather includes all technical solutions falling within the scope of the claims.

What is claimed is:

1. A positive electrode active material, comprising hollow secondary particles; and, wherein the hollow secondary particles comprise $Li_aNi_xCo_yMn_z A_qM_pO_b$, wherein $0.2 \leq a \leq 1.2$, $1.8 \leq b \leq 2$, $0.3 \leq x \leq 0.6$, $0 \leq y \leq 0.4$, $0 \leq z \leq 0.4$, $0 \leq q \leq 0.02$, and $0 < p \leq 0.02$, element A comprises one or more of Al, Ti, Zr, Sr, B, La and Y, and element M comprises one or more of W, Mo, Nb, Y, Ta, La, Zr and Co; and atomic percent of the element M at grain boundaries is greater than or equal to atomic percent of the element M in the bulk-phase part of primary particles, and a distance from the bulk-phase part to the surface of the primary particles is equal to a volume average particle size Dv50 of the primary particles multiplied by 5%; and the element A is distributed in the hollow secondary particles by bulk doping.

2. The positive electrode active material of claim 1, wherein residual alkali in the positive electrode active material comprises $Li^2CO^3$ and LiOH; in the positive electrode active material, content of $Li_2CO_3$ is s, and content of LiOH is t, wherein 0.05 wt %<s<3wt %, and 0<t<0.4wt %.

3. The positive electrode active material of claim 2, wherein at least one of the following conditions (a1) and (a2) is satisfied:

(a1) 0.05wt %≤s≤0.4wt %; and (a2) 0<t≤0.25wt %.

4. The positive electrode active material of claim 1, wherein 0<q≤0.005.

5. The positive electrode active material of claim 1, wherein 0<p≤0.01.

6. The positive electrode active material of claim 1, wherein at least one of the following conditions (b1) to (b5) is satisfied:

(b1) the volume average particle size Dv50 of the hollow secondary particles is 2-5 μm;

(b2) the volume average particle size Dv50 of the hollow secondary particles is 2.5-3.5 μm;

(b3) the hollow secondary particles have a wall thickness of 0.2-1.6 μm;

(b4) a ratio of cavity diameter of the hollow secondary particles to the volume average particle size Dv50 of the hollow secondary particles is k, wherein 0.1≤k≤0.8; and (b5) the ratio of the cavity diameter of the hollow secondary particles to the volume average particle size Dv50 of the hollow secondary particles is k, wherein 0.5≤k≤0.8.

7. The positive electrode active material of claim 1, wherein the positive electrode active material further comprises a coating layer, the coating layer is distributed on at least a part of the surface of the hollow secondary particles; and the coating layer contains element Al and/or element B.

8. The positive electrode active material of claim 7, wherein in the positive electrode active material, a ratio of total content of the element Al and/or element B in the coating layer to mass of the positive electrode active material is b, satisfying at least one of the following conditions (c1) and (c2):

(c1) 0<b≤5wt %; and (c2) 0.1wt %<b<2wt %.

9. The positive electrode active material of claim 7, wherein in the coating layer, at least one of the following conditions (d1) and (d2) is satisfied:

(d1) a mass ratio of Al to B is 1-5; and (d2) the mass ratio of Al to B is 2-2.5.

10. The positive electrode active material of claim 1, wherein the positive electrode active material has a true density of≥4.6g/cm³.

11. A positive electrode plate, comprising the positive electrode active material of claim 1.

12. A secondary battery, comprising the positive electrode plate of claim 11.

13. An electrical device, comprising the secondary battery of claim 12.

14. A preparation method for the positive electrode active material of claim 1, comprising:

heating a solution containing transition metal salts to form a carbonate core;

performing a precipitation reaction on the surface of the carbonate core so as to obtain a precursor having a carbonate-containing core and a hydroxide-containing shell; and mixing the precursor, a lithium salt, a material containing element A and a raw material containing element M, and sintering to obtain hollow secondary particles.

15. The preparation method of claim 14, wherein at least one of the following conditions (e1) to (e3) is satisfied:

(e1) the pH value of the solution containing transition metal salts is 10.5-12;

(e2) the time for heating the solution containing transition metal salts is 14-25 h;

(e3) the time for the precipitation reaction is 20-28 h; and (e4) a molar ratio of the precursor to the lithium salt is 1:(1-1.2).

16. The preparation method of claim 14, wherein the preparation method further comprises:

mixing the hollow secondary particles with a raw material of a coating layer, and sintering to obtain a positive electrode active material having the coating layer distributed on at least a part of the surface of the hollow secondary particles; wherein the coating layer comprises element Al and/or element B.

* * * * *